(12) United States Patent
Choi

(10) Patent No.: US 12,164,171 B2
(45) Date of Patent: Dec. 10, 2024

(54) CAMERA MODULE

(71) Applicant: LG INNOTEK CO., LTD., Seoul (KR)

(72) Inventor: Yong Bok Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 713 days.

(21) Appl. No.: 17/422,058

(22) PCT Filed: Jan. 9, 2020

(86) PCT No.: PCT/KR2020/000396
§ 371 (c)(1),
(2) Date: Jul. 9, 2021

(87) PCT Pub. No.: WO2020/145687
PCT Pub. Date: Jul. 16, 2020

(65) Prior Publication Data
US 2022/0171155 A1 Jun. 2, 2022

(30) Foreign Application Priority Data
Jan. 11, 2019 (KR) .................. 10-2019-0003672

(51) Int. Cl.
*G02B 7/02* (2021.01)
*G02B 3/12* (2006.01)
(Continued)

(52) U.S. Cl.
CPC ............. *G02B 7/028* (2013.01); *G02B 3/12* (2013.01); *G03B 17/55* (2013.01); *H05B 3/84* (2013.01);
(Continued)

(58) Field of Classification Search
CPC .......... G02B 7/02; G02B 7/021; G02B 7/028; G02B 7/08; G02B 3/12; G02B 3/14;
(Continued)

(56) References Cited

U.S. PATENT DOCUMENTS

2007/0236802 A1 10/2007 Kohno
2017/0315274 A1 11/2017 Park et al.
(Continued)

FOREIGN PATENT DOCUMENTS

CN 102361520 A 2/2012
CN 104780302 A 7/2015
(Continued)

OTHER PUBLICATIONS

English translation of JP 2008304792. (Year: 2008).*

*Primary Examiner* — Jie Lei
(74) *Attorney, Agent, or Firm* — Birch, Stewart, Kolasch & Birch, LLP

(57) ABSTRACT

A camera module includes a liquid lens; a first connection substrate disposed on one of a top or a bottom of the liquid lens; a second connection substrate disposed on a remaining one of the top or the bottom of the liquid lens; a temperature sensor configured to sense a temperature of the liquid lens; and a controller configured to output a heating voltage corresponding to the sensed temperature, wherein at least one of the first or second connection substrate includes a heater configured to generate heat in response to the heating voltage, and wherein the heater is disposed at a position corresponding to at least one of an upper surface or a lower surface of the liquid lens.

20 Claims, 14 Drawing Sheets

(51) Int. Cl.
    *G03B 17/55*     (2021.01)
    *H05B 3/84*      (2006.01)
    *G02B 27/64*     (2006.01)
    *G03B 5/00*      (2021.01)

(52) U.S. Cl.
    CPC .............. *G02B 27/646* (2013.01); *G03B 5/00* (2013.01); *G03B 2205/0007* (2013.01); *H05B 2203/002* (2013.01); *H05B 2203/016* (2013.01)

(58) Field of Classification Search
    CPC ........ G02B 1/06; G02B 15/173; G02B 13/00; G02B 13/0075; G02B 27/64; G02B 27/646; G03B 3/10; G03B 30/00; G03B 5/00; G03B 17/55; G03B 13/36; G03B 2205/0007; G03B 2205/0084; G03B 2217/007; H05B 3/84; H05B 1/02; H05B 1/0252; H05B 2203/002; H05B 2203/016; H05B 2213/07

USPC ....... 359/665–667, 395, 512, 694, 820, 819, 359/822, 886

See application file for complete search history.

(56)  References Cited

U.S. PATENT DOCUMENTS

| | | |
|---|---|---|
| 2019/0129076 A1 | 5/2019 | Choi |
| 2019/0377238 A1 | 12/2019 | Jang et al. |

FOREIGN PATENT DOCUMENTS

| | | | | |
|---|---|---|---|---|
| CN | 109073792 A | 12/2018 | | |
| JP | 2007-206325 A | 8/2007 | | |
| JP | 2008-304792 A | 12/2008 | | |
| JP | 2008304792 | * 12/2008 | ............ | G02B 26/08 |
| JP | 2009-80187 A | 4/2009 | | |
| JP | 2009-200646 A | 9/2009 | | |
| KR | 10-2018-0087082 A | 8/2018 | | |
| KR | 10-1908658 B1 | 12/2018 | | |

* cited by examiner

[FIG. 1]
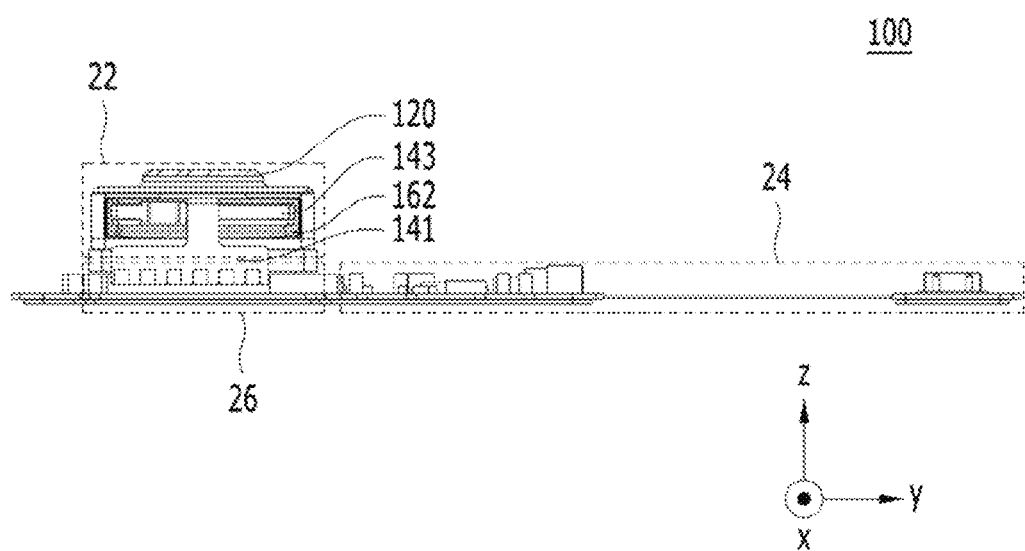

[FIG. 2]
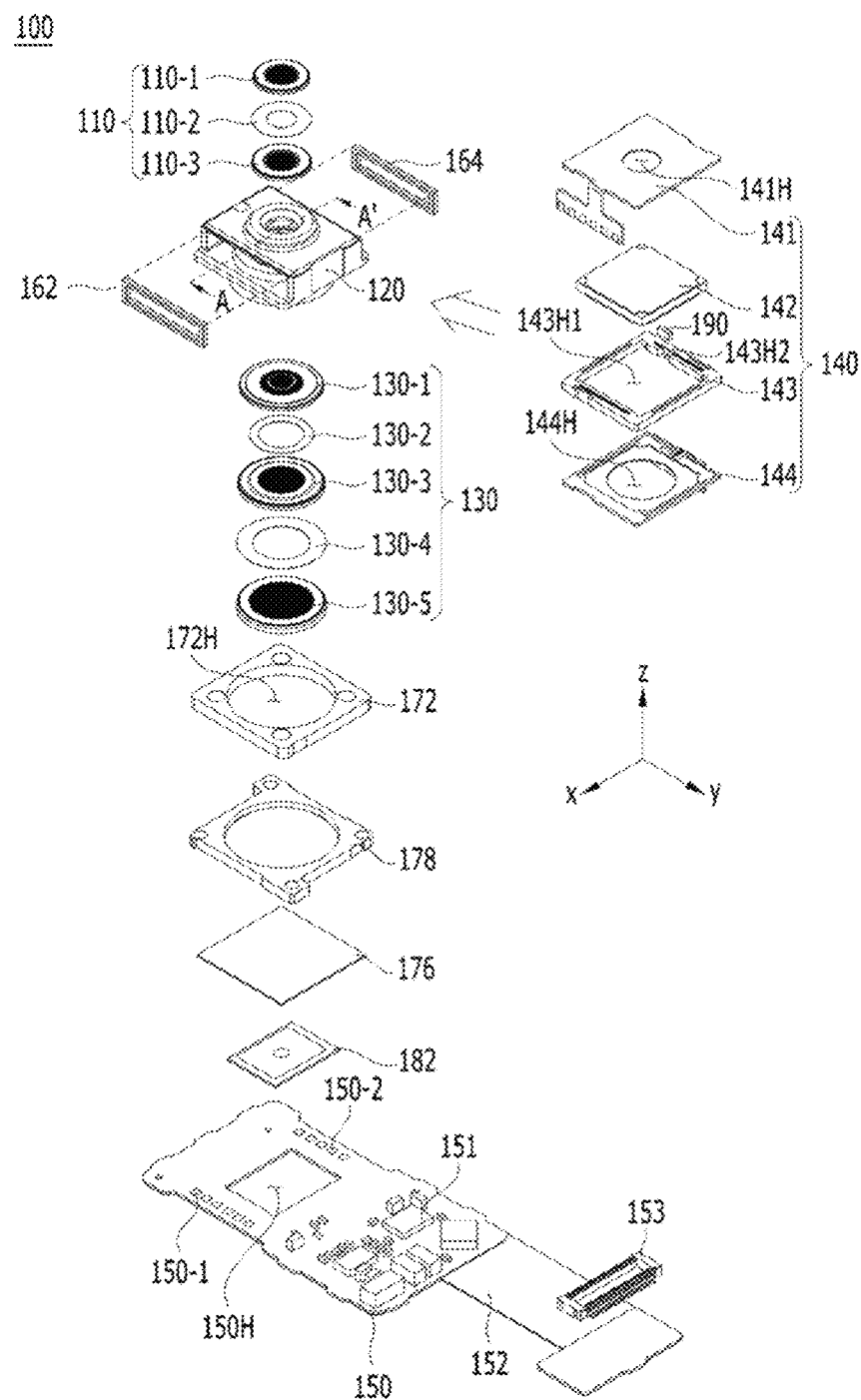

[FIG. 3]
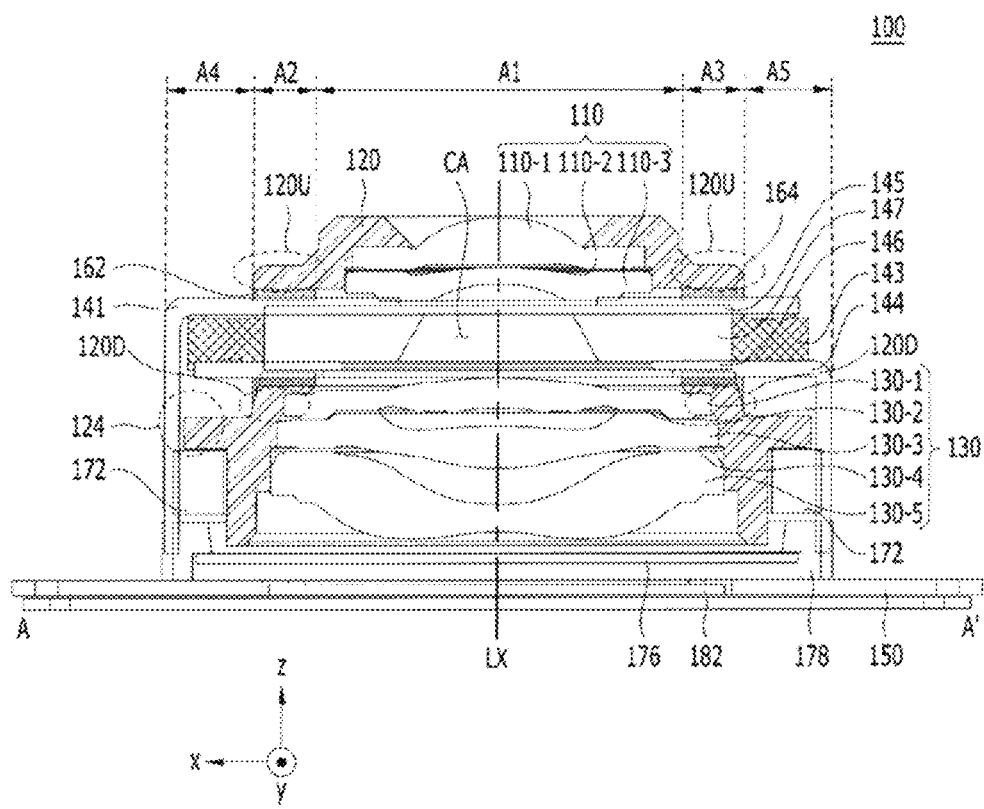

[FIG. 4A]
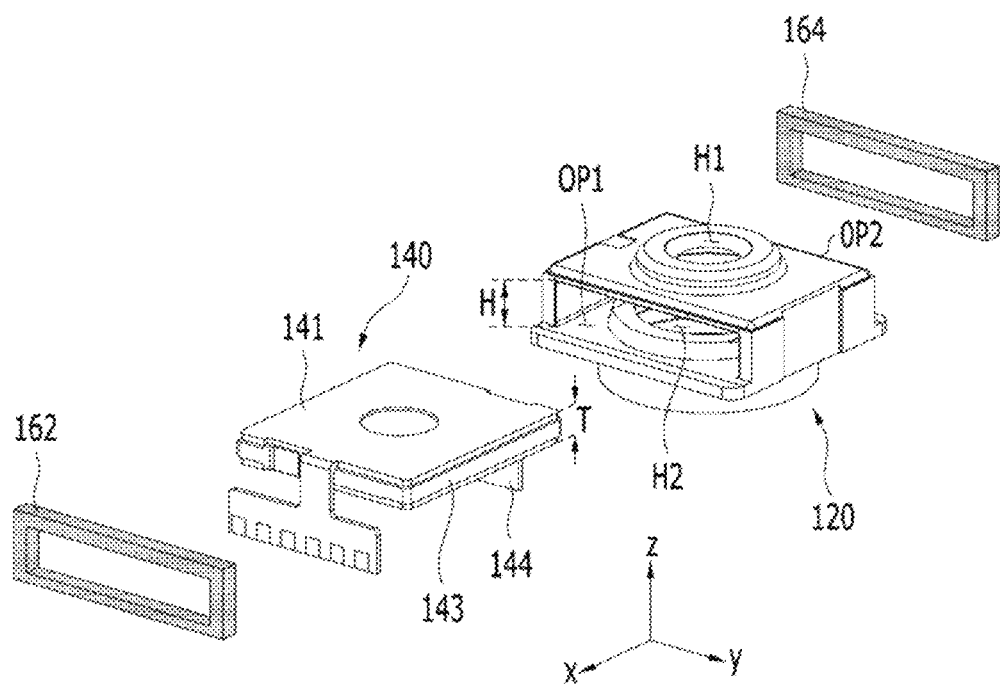

[FIG. 4B]
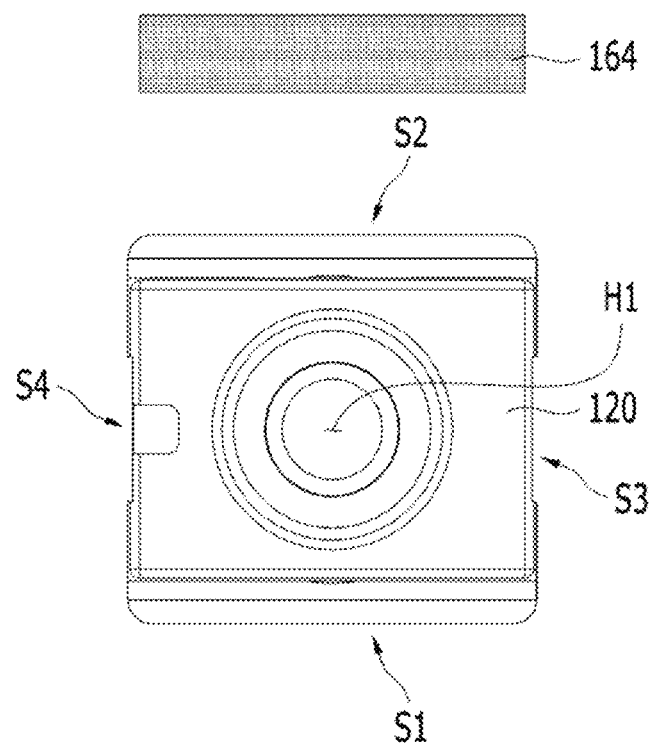
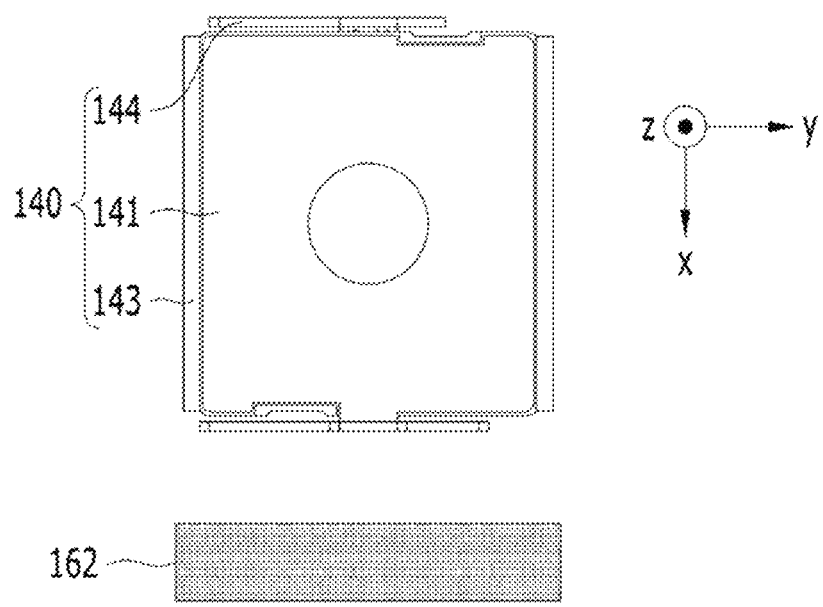

[FIG. 4C]
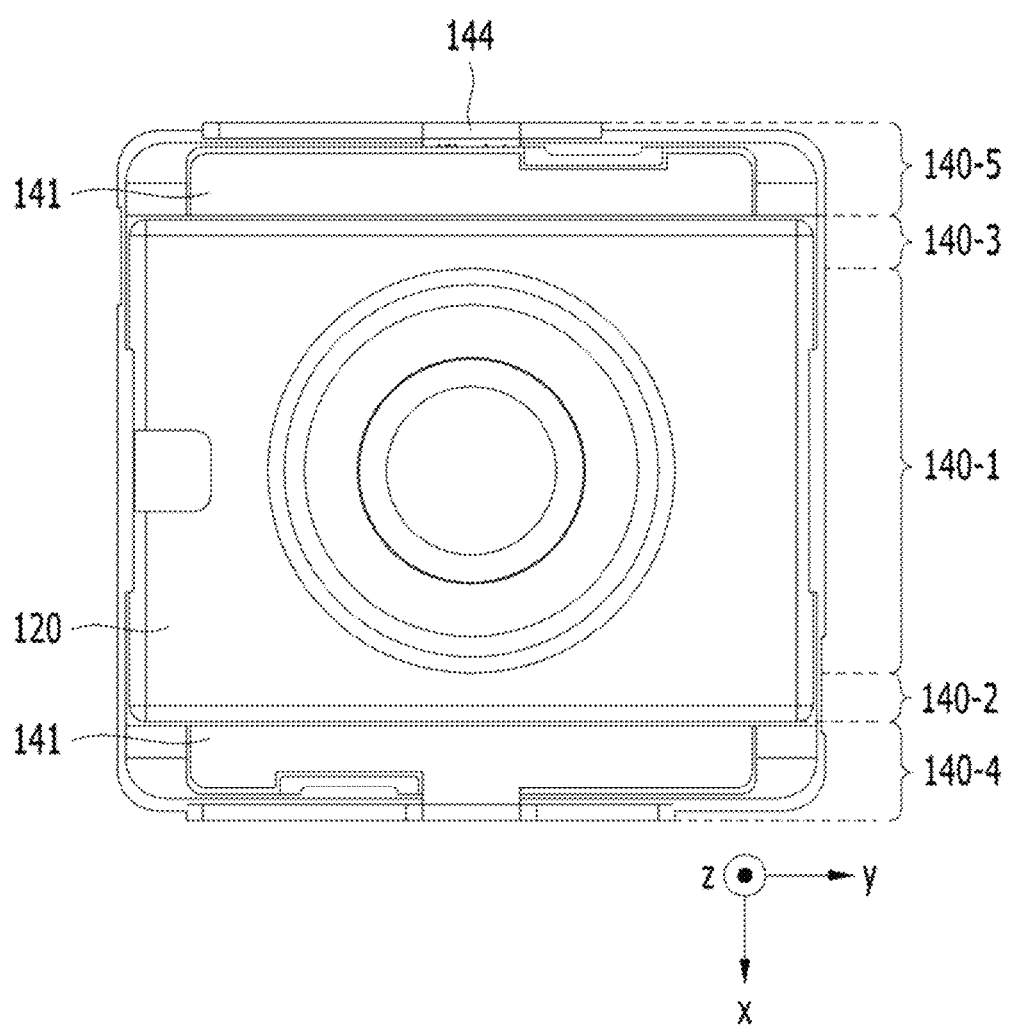

[FIG. 5A]
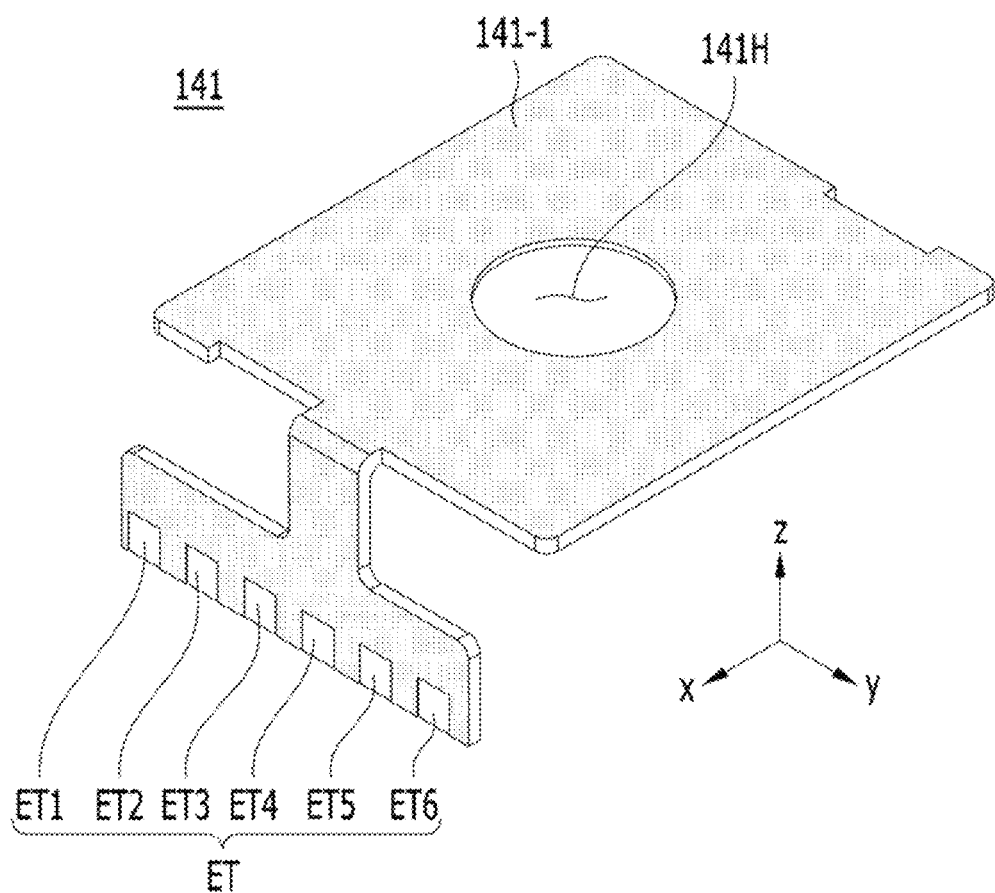

[FIG. 5B]
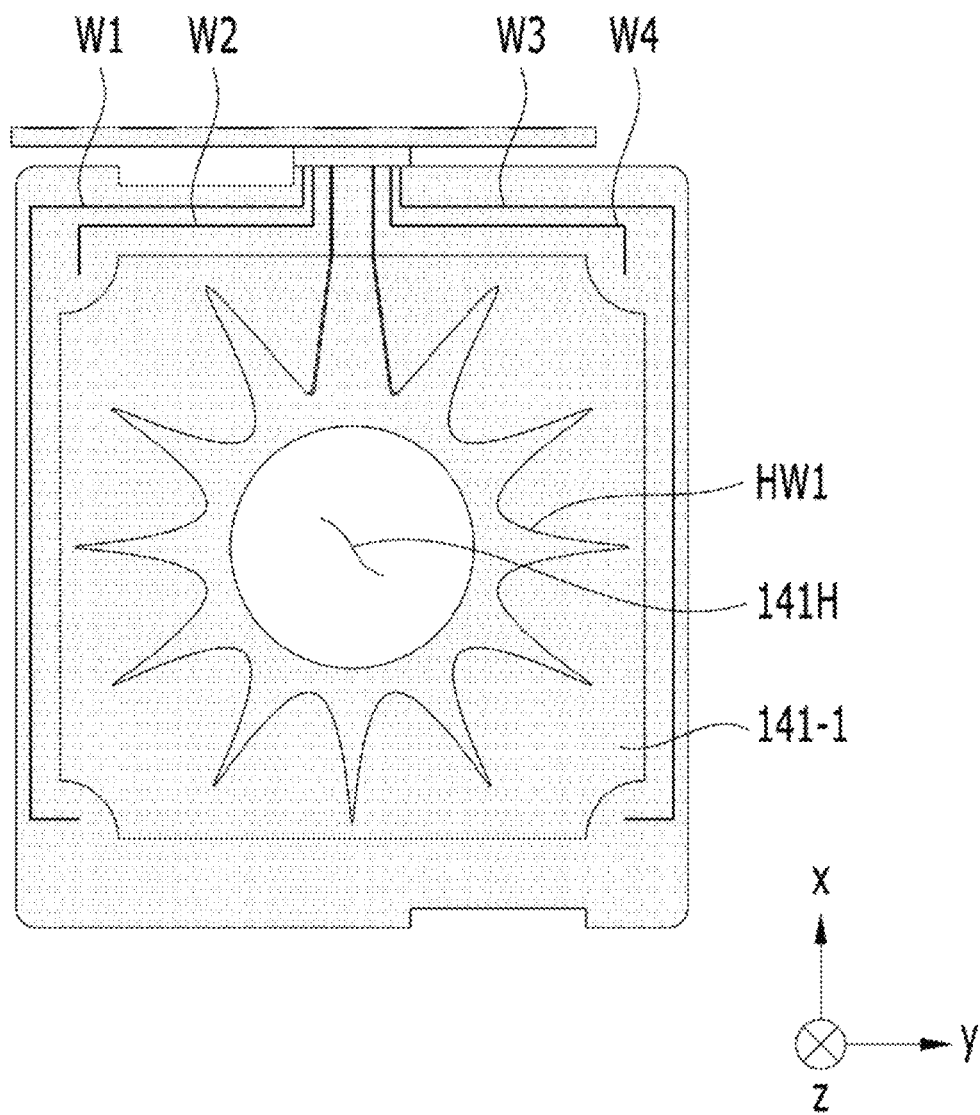

[FIG. 6A]
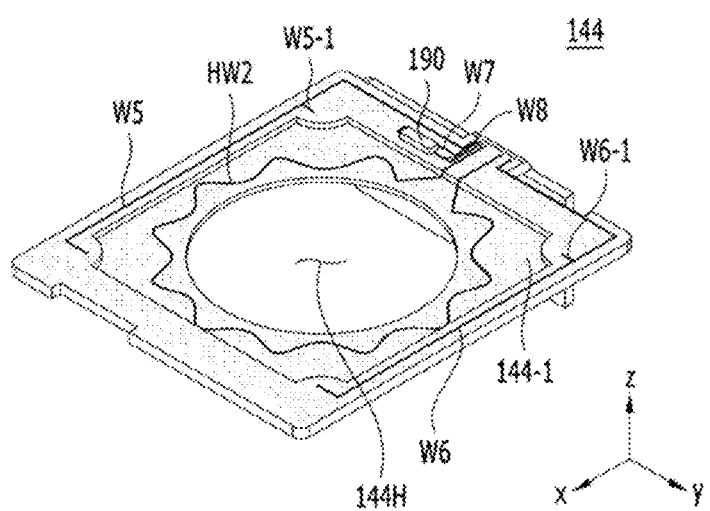

[FIG. 6B]
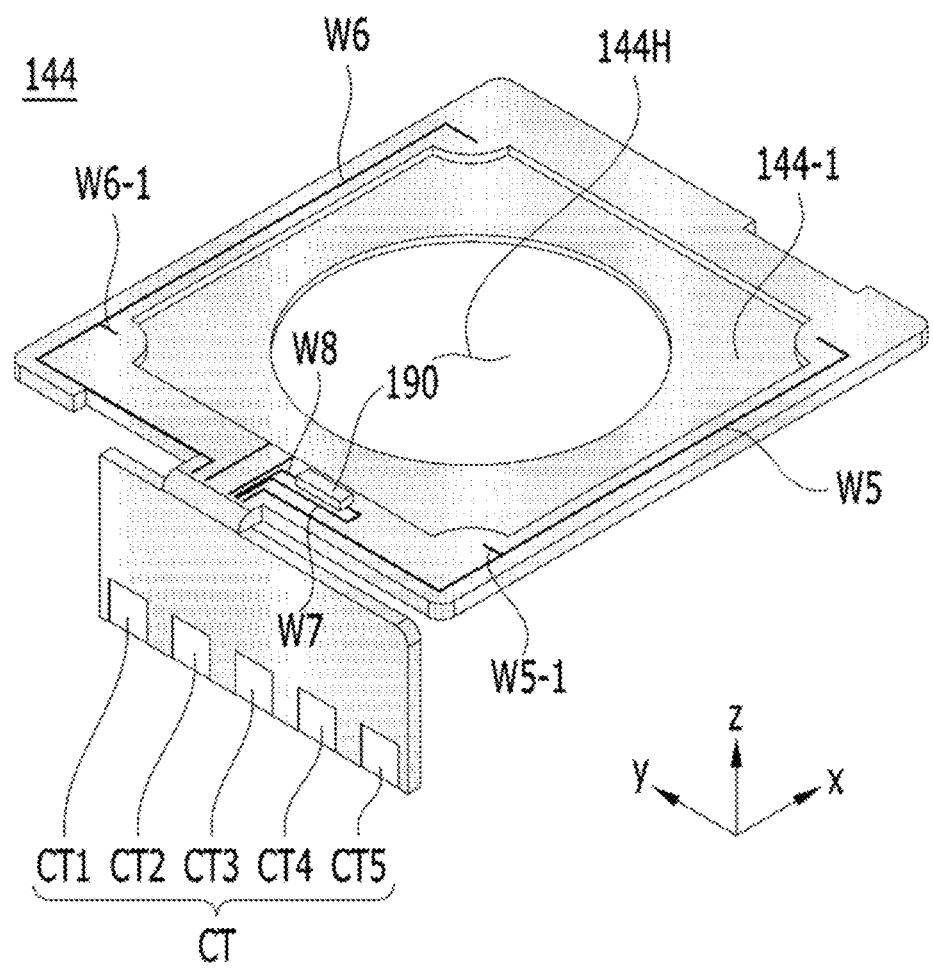

[FIG. 6C]
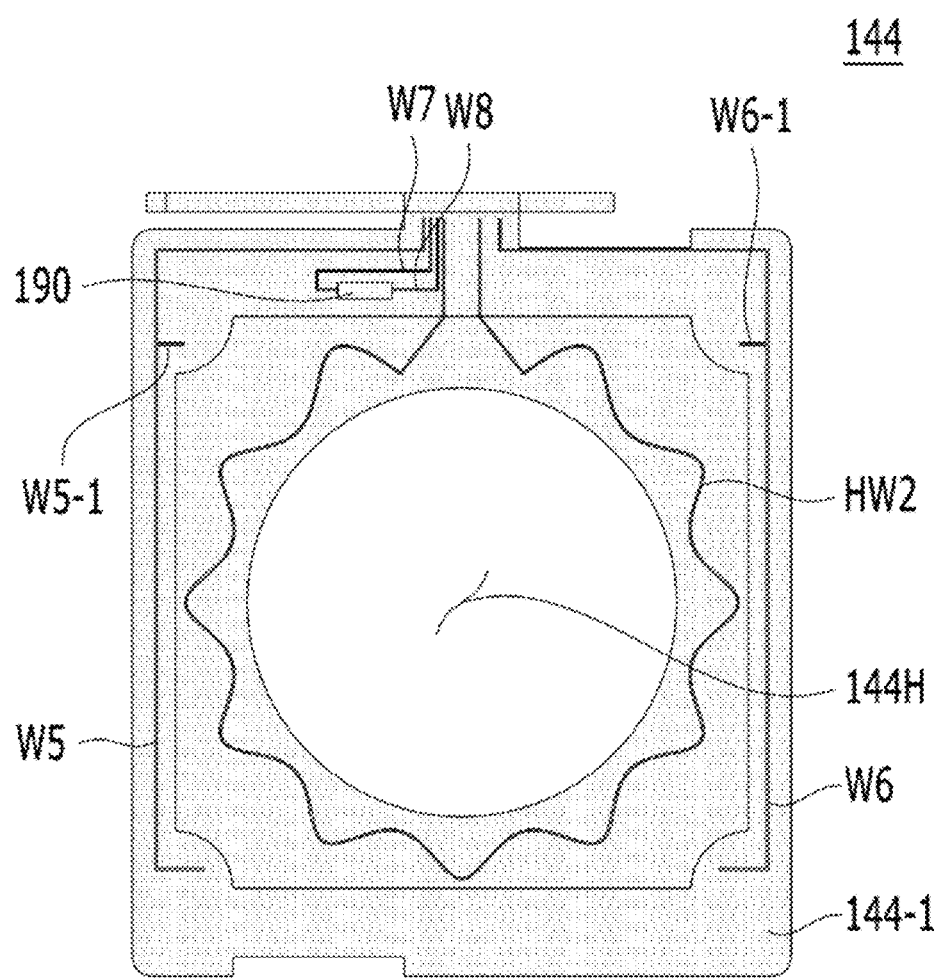

[FIG. 7]
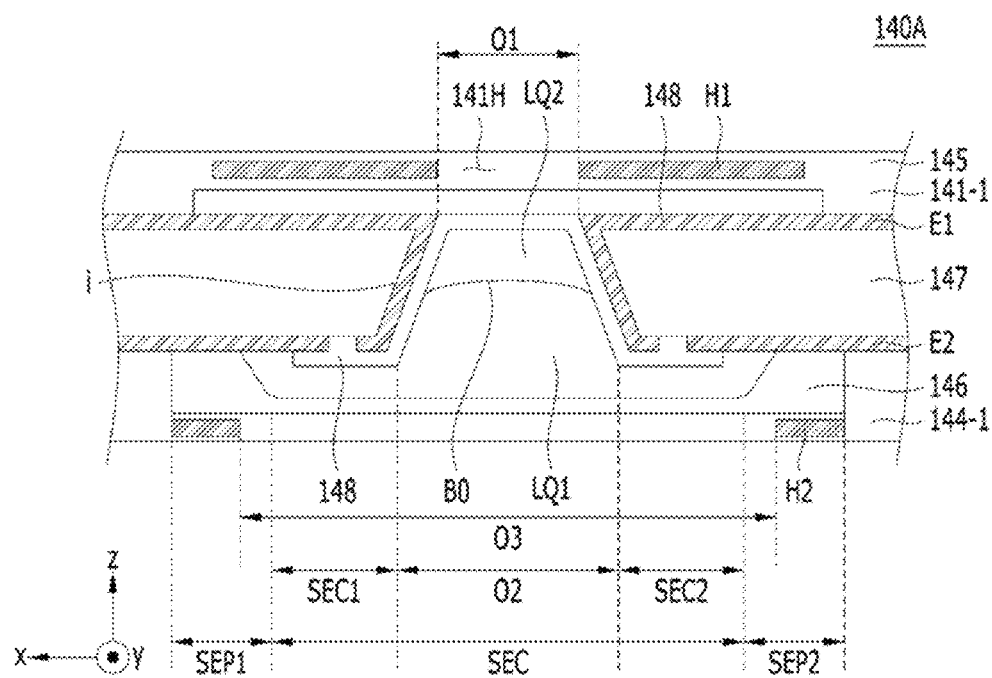

[FIG. 8]
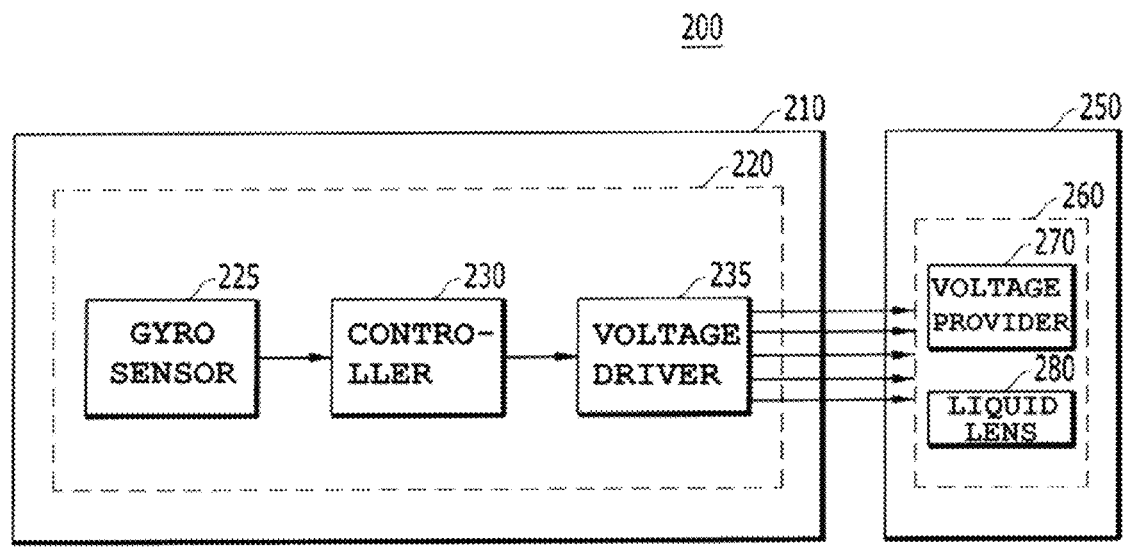
[FIG. 9]
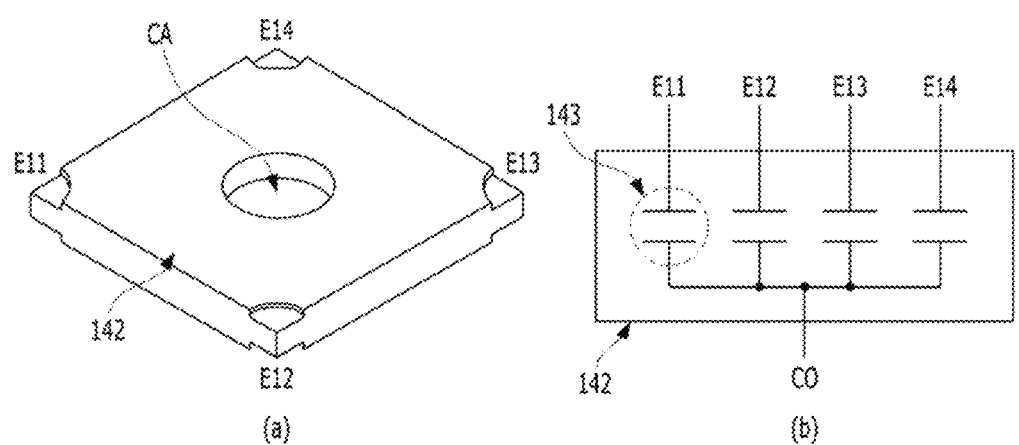

[FIG. 10]
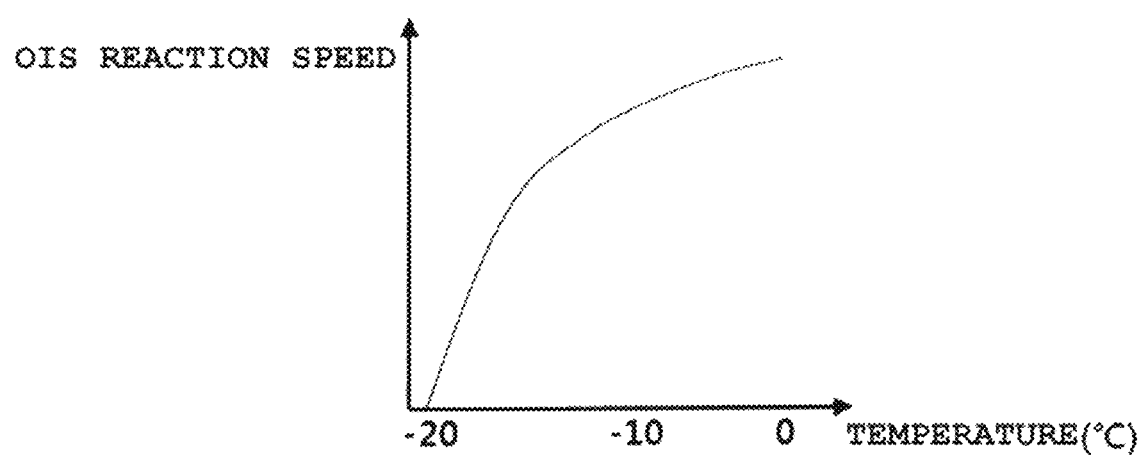

CAMERA MODULE

CROSS REFERENCE TO RELATED APPLICATIONS

This application is the National Phase of PCT International Application No. PCT/KR2020/000396, filed on Jan. 9, 2020, which claims priority under 35 U.S.C. 119(a) to Patent Application No. 10-2019-0003672, filed in the Republic of Korea on Jan. 11, 2019, all of which are hereby expressly incorporated by reference into the present application.

TECHNICAL FIELD

Embodiments relate to a camera module.

BACKGROUND ART

People who use portable devices demand optical devices that have high resolution, are small, and have various photographing functions. For example, these various photographing functions may be at least one of an optical zoom-in/zoom-out function, an auto-focusing (AF) function, or a hand-tremor compensation or optical image stabilization (OIS) function.

In the conventional art, in order to implement the various photographing functions described above, a method of combining a plurality of lenses and directly moving the combined lenses is used. In the case in which the number of lenses is increased, however, the size of the optical device may increase.

The auto-focusing and hand-tremor compensation functions are performed by moving or tilting a plurality of lenses, which are secured to a lens holder and are aligned along an optical axis, in an optical-axis direction or a direction perpendicular to the optical axis. To this end, a separate lens-moving apparatus is required in order to move a lens assembly composed of a plurality of lenses. However, the lens-moving apparatus has high power consumption, and an additional cover glass needs to be provided separately from a camera module in order to protect the lens-moving apparatus, thus causing a problem in that the overall size of the conventional camera module is increased. In order to solve this, studies have been conducted on a liquid lens unit that performs auto-focusing and hand-tremor compensation functions by electrically adjusting the curvature of an interface between two types of liquids.

Such a liquid lens unit may not be capable of accurately performing the aforementioned functions due to a phase change at a low temperature. Particularly, in the case in which the liquids included in the liquid lens unit undergo a phase change and become solids at a low temperature, the liquid lens unit may become incapable of properly performing an OIS function due to a decrease in reaction speed, thus leading to degradation in the performance thereof.

DISCLOSURE

Technical Problem

Embodiments provide a camera module that is capable of maintaining a constant temperature irrespective of changes in the temperature of the surrounding environment.

The objects to be accomplished by the embodiments are not limited to the above-mentioned objects, and other objects not mentioned herein will be clearly understood by those skilled in the art from the following description.

Technical Solution

A camera module according to an embodiment may include a liquid lens, a first connection substrate disposed on one of the top or the bottom of the liquid lens, a second connection substrate disposed on the other one of the top or the bottom of the liquid lens, a temperature sensor configured to sense the temperature of the liquid lens, and a controller configured to output a heating voltage corresponding to the sensed temperature, wherein at least one of the first or second connection substrate may include a heater configured to generate heat in response to the heating voltage, and the heater may be disposed at a position corresponding to the upper surface or the lower surface of the liquid lens.

For example, the liquid lens may include a first plate including a cavity having therein an inclined surface and accommodating a conductive liquid and a non-conductive liquid, a first electrode disposed on one surface of the first plate, the first electrode being electrically connected to the first connection substrate, a second electrode disposed on the opposite surface of the first plate, the second electrode being electrically connected to the second connection substrate, a second plate disposed on one of the top or the bottom of the first plate, and a third plate disposed on the other one of the top or the bottom of the first plate. The first plate may include a first opening formed at a position corresponding to the second plate and a second opening formed at a position corresponding to the third plate, the second opening having a size different from the size of the first opening.

For example, the heater may be disposed in the vicinity of the opening having the smaller size among the first opening and the second opening.

For example, the heater may further include a second heater disposed on the second connection substrate, the second heater being disposed in the vicinity of the second opening, having the larger size among the first and second openings, the second heater being configured to generate heat in response to a second heating voltage included in the heating voltage.

For example, the first connection substrate may include a first through-hole having a diameter equal to or larger than the diameter of the first opening, a first support portion disposed around the first through-hole, and a first heating wire disposed at the first support portion as the first heater.

For example, the first heating wire may be embedded in the first support portion.

For example, the first connection substrate may further include a first connection pad electrically connected to the controller, and the first connection pad may include a first electrode terminal connecting the first electrode to the controller and a first heating terminal connecting the first heating wire to the controller.

For example, the second connection substrate may include a second through-hole having a diameter equal to or larger than the diameter of the second opening, a second support portion disposed around the second through-hole, and a second heating wire disposed at the second support portion as the second heater.

For example, the second heating wire may be embedded in the second support portion.

For example, the second connection substrate may further include a second connection pad electrically connected to the controller, and the second connection pad may include a second electrode terminal connecting the second electrode to the controller and a second heating terminal connecting the second heating wire to the controller.

For example, the second connection pad may further include a temperature terminal connecting the temperature sensor to the controller.

For example, at least one of the first or second heating wire may have a heating pattern.

For example, the camera module may further include a spacer disposed so as to surround the liquid lens, the spacer including a receiving recess receiving the temperature sensor therein. The receiving recess may be formed in the inner side of the spacer that faces the liquid lens.

Advantageous Effects

In a camera module according to an embodiment, heat is transferred to a liquid lens using a heater when the temperature of the liquid lens is low, and thus the liquid lens may be maintained at a constant temperature even at a low temperature, whereby the camera module is capable of accurately performing the function thereof, particularly an OIS function, irrespective of temperature.

In a camera module according to an embodiment, a liquid lens unit may be stably fixed or coupled to a holder using an adhesive member.

In a camera module according to an embodiment, a separate process of manufacturing a heater is not required, thus avoiding an increase in the number of manufacturing processes and an increase in manufacturing cost.

However, the effects achievable through the embodiments are not limited to the above-mentioned effects, and other effects not mentioned herein will be clearly understood by those skilled in the art from the following description.

DESCRIPTION OF DRAWINGS

FIG. 1 illustrates a schematic side view of a camera module according to an embodiment.

FIG. 2 illustrates an exploded perspective view of an embodiment of the camera module shown in FIG. 1.

FIG. 3 illustrates a cross-sectional view of the camera module, taken along line A-A' in FIG. 2.

FIGS. 4A to 4C are views for explaining the holder, the liquid lens unit, and the first and second adhesive members shown in FIGS. 2 and 3.

FIGS. 5A and 5B respectively illustrate an upper perspective view and a bottom view of a first connection substrate.

FIGS. 6A, 6B and 6C respectively illustrate an upper front perspective view, an upper rear perspective view, and a plan view of a second connection substrate.

FIG. 7 illustrates a cross-sectional view of an embodiment of the above-described liquid lens unit.

FIG. 8 is a schematic block diagram of the camera module.

FIGS. 9(a) and (b) are views for explaining a liquid lens, the interface of which is adjusted in response to a driving voltage.

FIG. 10 is a graph showing changes in an OIS reaction speed according to temperature.

BEST MODE

Hereinafter, exemplary embodiments will be described in detail with reference to the accompanying drawings. While the disclosure is susceptible to various modifications and alternative forms, specific embodiments thereof are shown by way of example in the drawings. However, the disclosure should not be construed as being limited to the embodiments set forth herein, but on the contrary, the disclosure is to cover all modifications, equivalents, and alternatives falling within the spirit and scope of the embodiments.

It may be understood that, although the terms "first", "second", etc. may be used herein to describe various elements, these elements are not to be limited by these terms. These terms are generally only used to distinguish one element from another. In addition, terms particularly defined in consideration of the construction and operation of the embodiments are used only to describe the embodiments, but do not define the scope of the embodiments.

In the following description of the embodiments, it will be understood that, when each element is referred to as being "on" or "under" another element, it can be directly on or under the other element, or can be indirectly formed such that one or more intervening elements are also present. In addition, when an element is referred to as being "on" or "under", "under the element" as well as "on the element" may be included based on the element.

In addition, relational terms, such as "on/upper part/above" and "under/lower part/below", are used only to distinguish between one subject or element and another subject or element, without necessarily requiring or involving any physical or logical relationship or sequence between such subjects or elements.

A variable lens may be a variable focus lens. Further, a variable lens may be a lens that is adjustable in focus. A variable lens may be at least one of a liquid lens, a polymer lens, a liquid crystal lens, a VCM type, or an SMA type. A liquid lens may include a liquid lens including one liquid and a liquid lens including two liquids. A liquid lens including one liquid may change the focus by adjusting a membrane disposed at a position corresponding to the liquid, for example, by pressing the membrane using the electromagnetic force between a magnet and a coil. A liquid lens including two liquids may include a conductive liquid and a non-conductive liquid, and may adjust the interface formed between the conductive liquid and the non-conductive liquid using voltage applied to the liquid lens. A polymer lens may change the focus by controlling a polymer material using a driver such as a piezo actuator. A liquid crystal lens may change the focus by controlling a liquid crystal using electromagnetic force. A VCM type may change the focus by adjusting a solid lens or a lens assembly including a solid lens using electromagnetic force between a magnet and a coil. An SMA type may change the focus by controlling a solid lens or a lens assembly including a solid lens using a shape memory alloy.

Hereinafter, camera modules 100 and 200 according to embodiments will be described as including a liquid lens as a variable lens, but the embodiments are not limited thereto.

Hereinafter, a camera module 100 according to embodiments will be described using the Cartesian coordinate system, but the embodiments are not limited thereto. That is, in the Cartesian coordinate system, the x-axis, the y-axis, and the z-axis are perpendicular to each other, but the embodiments are not limited thereto. That is, the x-axis, the y-axis, and the z-axis may intersect each other obliquely, rather than being perpendicular to each other.

Hereinafter, a camera module 100 according to an embodiment will be described with reference to the accompanying drawings.

FIG. 1 illustrates a schematic side view of the camera module 100 according to an embodiment.

Referring to FIG. 1, the camera module 100 may include a lens assembly 22, a control circuit 24, and an image sensor 26.

First, the lens assembly 22 may include a plurality of lens units and a holder in which the plurality of lens units is accommodated. As will be described later, the plurality of lens units may include a liquid lens unit, and may further include a first lens unit or a second lens unit. Alternatively, the plurality of lens units may include first and second lens units and a liquid lens unit.

The control circuit 24 serves to supply a driving voltage (or an operation voltage) to the liquid lens unit.

The control circuit 24 and the image sensor 26 described above may be disposed on a single printed circuit board (PCB), but this is merely given by way of example, and the embodiments are not limited thereto.

When the camera module 100 according to the embodiment is applied to an optical device (or an optical instrument), the configuration of the control circuit 24 may be designed differently depending on the specifications required for the optical device. In particular, the control circuit 24 may be implemented as a single chip, and may reduce the magnitude of the driving voltage applied to the lens assembly 22. Thereby, the size of the optical device mounted in a portable device may be further reduced.

FIG. 2 illustrates an exploded perspective view of an embodiment of the camera module 100 shown in FIG. 1.

Referring to FIG. 2, the camera module 100 may include a lens assembly, a main board 150, an image sensor 182, and a heater H (not shown in FIG. 2). In addition, the camera module 100 may further include a temperature sensor 190. In addition, the camera module 100 may further include a middle base 172. In addition, the camera module 100 may further include a filter 176 and a sensor base 178. In addition, the camera module 100 may further include at least one adhesive member. The at least one adhesive member serves to couple or fix the liquid lens unit 140 to the holder 120. Although the at least one adhesive member is illustrated in FIG. 2 as including both a first adhesive member 162 and a second adhesive member 164, the embodiments are not limited thereto. That is, according to another embodiment, the at least one adhesive member may selectively include the first adhesive member 162 or the second adhesive member 164. Each of the first and second adhesive members 162 and 164 may include an adhesive, epoxy, or the like, and the adhesive may include a silicone-based material, a sealing material, or a light-curable adhesive material. However, the embodiments are not limited to any specific material of each of the first and second adhesive members 162 and 164.

The first adhesive member 162 and the second adhesive member 164 may include the same material as each other, or may include different materials from each other.

According to the embodiment, at least one of the components 110 to 190 of the camera module 100 shown in FIG. 2 may be omitted. Alternatively, at least one component other than the components 110 to 190 shown in FIG. 2 may be further included in the camera module 100.

FIG. 3 illustrates a cross-sectional view of the camera module 100, taken along line A-A' in FIG. 2.

Referring to FIGS. 2 and 3, the lens assembly may include at least one of the first lens unit 110, the holder 120, the second lens unit 130, the liquid lens unit 140, the first adhesive member 162, or the second adhesive member 164, and may correspond to the lens assembly 22 shown in FIG. 1. The lens assembly may be disposed on the main board 150.

In the lens assembly, the first lens unit 110 and the second lens unit 130 may be respectively referred to as a "first solid lens unit" and a "second solid lens unit" in order to be distinguished from the liquid lens unit 140.

The first lens unit 110 may be disposed at the upper side of the lens assembly, and may be a region on which light is incident from outside the lens assembly. That is, the first lens unit 110 may be disposed above the liquid lens unit 140 within the holder 120. The first lens unit 110 may be implemented using a single lens, or may be implemented using two or more lenses that are aligned along a center axis to form an optical system.

Here, the center axis may be an optical axis LX of the optical system, which is formed by the first lens unit 110, the liquid lens unit 140, and the second lens unit 130 included in the camera module 100, or may be an axis parallel to the optical axis LX. The optical axis LX may correspond to the optical axis of the image sensor 182. That is, the first lens unit 110, the liquid lens unit 140, the second lens unit 130, and the image sensor 182 may be disposed so as to be aligned along the optical axis LX through active alignment (AA).

Here, active alignment may mean an operation of aligning the optical axes of the first lens unit 110, the second lens unit 130, and the liquid lens unit 140 with each other and adjusting an axis or distance relationship between the image sensor 182 and the lens units 110, 130 and 140 in order to acquire an improved image.

In an embodiment, active alignment may be performed through an operation of analyzing image data generated by the image sensor 182, which receives light introduced from a specific object via at least one of the first lens unit 110, the second lens unit 130, or the liquid lens unit 140. For example, active alignment may be performed in the following sequence.

In one example, after active alignment (first alignment) for adjusting relative positions between the first lens unit 110 and the second lens unit 130, which are fixedly mounted to the holder 120, and the image sensor 182 is completed, active alignment (second alignment) for adjusting relative positions between the liquid lens unit 140, which is inserted into the holder 120, and the image sensor 182 may be performed. The first alignment may be performed as a gripper grips the middle base 172 and displaces the same to various positions, and the second alignment may be performed as the gripper grips a spacer 143 of the liquid lens unit 140 and displaces the same to various positions.

However, active alignment may be performed in any other sequence different from the above-described sequence.

Assuming the case in which the middle base 172 is omitted, active alignment may be performed in the state in which the gripper grips a protruding portion 124 of the holder 120. At this time, if the protruding portion 124 has a small thickness, active alignment may not be accurately performed. In order to prevent this, the camera module 100 may include the middle base 172, which is thicker than the protruding portion 124 of the holder 120. Management of the thickness of the holder 120 may be necessary in order to form the holder 120, which has a relatively complicated shape compared to the shape of the middle base 172, using injection molding or the like. When the thickness of a portion of the holder 120 for active alignment is not sufficient to be gripped, the middle base 172 may be added so that active alignment may be performed in the state in which a portion of the middle base 172 is gripped. However, when the thickness of the protruding portion 124 is sufficiently great, the middle base 172 may be omitted. In addition, the protruding portion 124 and the middle base 172 may be coupled to each other using an adhesive member, for example, epoxy.

In another example, after active alignment (third alignment) for adjusting relative positions between the first lens unit 110, the second lens unit 130, and the liquid lens unit 140, which are fixedly mounted to the holder 120, is completed, active alignment (fourth alignment) for adjusting relative positions between the lenses of the lens assembly, which have completely undergone the third alignment, and the image sensor 182 may be performed. The third alignment may be performed as a gripper grips the spacer 143 of the liquid lens unit 140 and displaces the same to various positions, and the fourth alignment may be performed as the gripper grips the middle base 172 and displaces the same to various positions.

In addition, as illustrated in FIG. 3, the first lens unit 110 may include, for example, two lenses 110-1 and 110-3, but this is merely given by way of example, and the number of lenses included in the first lens unit 110 may be one or three or more. In addition, in order to maintain a constant interval between the two lenses 110-1 and 110-3 and thus to compensate for an error in the manufacture of the lenses, a first lens spacer 110-2 may be disposed between the two lenses 110-1 and 110-3. In some cases, the lens spacer 110-2 may be omitted.

In addition, an exposure lens may be disposed at the upper side of the first lens unit 110. Here, the exposure lens may be the outermost lens among the lenses included in the first lens unit 110. That is, the lens 110-1 located at the uppermost side of the first lens unit 110 may protrude upwards, and therefore may function as an exposure lens. The exposure lens faces the risk of damage to the surface thereof since it protrudes outwards from the holder 120. When the surface of the exposure lens is damaged, the quality of the image captured by the camera module 100 may be deteriorated. Therefore, in order to prevent or minimize damage to the surface of the exposure lens, a cover glass may be disposed, or a coating layer may be formed on the top of the exposure lens. Alternatively, in order to prevent damage to the surface of the exposure lens, the exposure lens may be formed of a wear-resistant material having higher rigidity than the lenses of the other lens units.

In addition, the outer diameter of each of the lenses 110-1 and 110-3 included in the first lens unit 110 may gradually increase in a direction approaching the bottom (e.g. in the −z-axis direction), but the embodiments are not limited thereto.

FIGS. 4A to 4C are views for explaining the holder 120, the liquid lens unit 140, the first adhesive member 162, and the second adhesive member 164 shown in FIGS. 2 and 3. That is, FIG. 4A illustrates an exploded perspective view of the holder 120, the liquid lens unit 140, the first adhesive member 162, and the second adhesive member 164, FIG. 4B illustrates an exploded plan view of the holder 120, the liquid lens unit 140, the first adhesive member 162, and the second adhesive member 164, and FIG. 4C illustrates a plan view of the holder 120, the liquid lens unit 140, the first adhesive member 162, and the second adhesive member 164 in a coupled state. In FIG. 4C, the first and second adhesive members 162 and 164 are hidden by the holder 120, and thus are not visible.

The holder 120 may include first and second holes H1 and H2 and first to fourth sidewalls (or side surfaces or side portions) S1, S2, S3 and S4.

The first and second holes H1 and H2 may be respectively formed in the upper portion and the lower portion of the holder 120 to open the upper portion and the lower portion of the holder 120, respectively. Here, the first hole H1 and the second hole H2 may be through-holes. The first lens unit 120 may be accommodated in, mounted in, seated in, in contact with, fixed to, provisionally fixed to, supported by, coupled to, or disposed in the first hole H1, which is formed in the holder 120, and the second lens unit 130 may be accommodated in, mounted in, seated in, in contact with, fixed to, provisionally fixed to, supported by, coupled to, or disposed in the second hole H2, which is formed in the holder 120.

In addition, the first and second sidewalls S1 and S2 of the holder 120 may be disposed so as to face each other in a direction perpendicular to the direction of the optical axis LX (e.g. in the x-axis direction), and the third and fourth sidewalls S3 and S4 may be disposed so as to face each other in a direction perpendicular to the direction of the optical axis LX (e.g. in the y-axis direction). In addition, as illustrated in FIG. 4A, the first sidewall S1 of the holder 120 may include a first opening OP1, and the second sidewall S2 thereof may include a second opening OP2, having a shape that is the same as or similar to that of the first opening OP1. Thus, the first opening OP1 formed in the first sidewall S1 and the second opening OP2 formed in the second sidewall S2 may be disposed so as to face each other in a direction perpendicular to the direction of the optical axis LX (e.g. in the x-axis direction).

The inner space in the holder 120, in which the liquid lens unit 140 is to be disposed, may be open due to the first and second openings OP1 and OP2. In this case, the liquid lens unit 140 may be inserted through the first or second opening OP1 or OP2 so as to be mounted in, seated in, in contact with, fixed to, provisionally fixed to, supported by, coupled to, or disposed in the inner space in the holder 120. For example, the liquid lens unit 140 may be inserted into the inner space in the holder 120 through the first opening OP1.

As such, in order to allow the liquid lens unit 140 to be inserted into the inner space in the holder 120 through the first or second opening OP1 or OP2, the size of the first or second opening OP1 or OP2 in the holder 120 in the direction of the optical axis LX may be greater than the cross-sectional area of the liquid lens unit 140 in the y-axis direction and the z-axis direction. For example, the height H corresponding to the size of each of the first and second openings OP1 and OP2 in the direction of the optical axis LX may be greater than the thickness T of the liquid lens unit 140.

The second lens unit 130 may be disposed below the liquid lens unit 140 within the holder 120. The second lens unit 130 may be spaced apart from the first lens unit 110 in the optical-axis direction (e.g. in the z-axis direction).

The light introduced into the first lens unit 110 from outside the camera module 100 may pass through the liquid lens unit 140 and may be introduced into the second lens unit 130. The second lens unit 130 may be implemented using a single lens, or may be implemented using two or more lenses, which are aligned along the center axis to form an optical system. For example, as illustrated in FIGS. 2 and 3, the second lens unit 130 may include three lenses 130-1, 130-3 and 130-5, but this is merely given by way of example, and the number of lenses included in the second lens unit 130 may be two or less, or may be four or more. In addition, second and third lens spacers 130-2 and 130-4, which maintain constant intervals between the three lenses 130-1, 130-3 and 130-5 and thus compensate for an error in the manufacture of the lenses, may be disposed between neighboring lenses. That is, the second lens spacer 130-2 may be disposed between the two lenses 130-1 and 130-3, and the third lens spacer 130-4 may be disposed between the two lenses 130-3 and 130-5. In some cases, at least one of the second or third lens spacer 130-2 or 130-4 may be omitted.

In addition, the outer diameter of each of the lenses 130-1, 130-3 and 130-5 included in the second lens unit 130 may gradually increase in a direction approaching the bottom (e.g. in the −z-axis direction), but the embodiments are not limited thereto.

Unlike the liquid lens unit 140, each of the first lens unit 110 and the second lens unit 130 may be a solid lens formed of glass or plastic, but the embodiments are not limited to any specific material of each of the first lens unit 110 and the second lens unit 130.

Referring to FIG. 4C, the liquid lens unit 140 may include a first portion 140-1 to a fifth portion 140-5.

In the liquid lens unit 140, the first portion 140-1 may be a portion that is mounted in, seated in, in contact with, fixed to, provisionally fixed to, supported by, coupled to, or disposed in the inner space between the first hole H1 and the second hole H2 in the holder 120 in the direction of the optical axis LX or the direction parallel to the direction of the optical axis LX (e.g. in the z-axis direction). That is, the first portion 140-1 of the liquid lens unit 140 may be disposed between the first lens unit 110 and the second lens unit 130. However, the embodiments are not limited thereto. For example, according to another embodiment, the first lens unit 110 or the second lens unit 130 may be omitted, the liquid lens unit 140 may be disposed above the first lens unit 110 within the holder 120, or the liquid lens unit 140 may be disposed below the second lens unit 130 within the holder 120. In addition, the first portion 140-1 of the liquid lens unit 140 may be a portion that is mounted in, seated in, in contact with, fixed to, provisionally fixed to, supported by, coupled to, or disposed in the inner space between the first opening OP1 and the second opening OP2 in the holder 120 in the direction perpendicular to the direction of the optical axis LX (e.g. in the x-axis direction).

In addition, the second and third portions 140-2 and 140-3 of the liquid lens unit 140 may be portions that are respectively disposed in the first and second openings OP1 and OP2 in the holder 120. The second and third portions 140-2 and 140-3 will be described later in detail in connection with the description of the first and second adhesive members 162 and 164.

In addition, the fourth portion 140-4 of the liquid lens unit 140 may be a portion that protrudes from the first sidewall S1 of the holder 120. For example, as shown in FIG. 4C, the fourth portion 140-4 of the liquid lens unit 140 may be a portion protruding from the first opening OP1 formed in the first sidewall S1 of the holder 120. That is, the fourth portion 140-4 may be a portion protruding from the first opening OP1 to the outside of the holder 120.

In addition, the fifth portion 140-5 of the liquid lens unit 140 may be a portion that protrudes from the second sidewall S2 of the holder 120. For example, as shown in FIG. 4C, the fifth portion 140-5 of the liquid lens unit 140 may be a portion protruding from the second opening OP2 formed in the second sidewall S2 of the holder 120. That is, the fifth portion 140-5 may be a portion protruding outside the holder 120 at the side of the second opening OP2.

In addition, referring to FIG. 3, the liquid lens unit 140 may include first to fifth areas A1, A2, A3, A4 and A5.

The first area A1 is an area between the second area A2 and the third area A3 and corresponds to the first portion 140-1 shown in FIG. 4C, the second area A2 is an area disposed inside the first opening OP1 in the holder 120 and corresponds to the second portion 140-2 shown in FIG. 4C, and the third area A3 is an area disposed inside the second opening OP2 in the holder 120 and corresponds to the third portion 140-3 shown in FIG. 4C. The fourth area A4 is an area protruding from the first opening OP1 in the holder 120, and corresponds to the fourth portion 140-4 shown in FIG. 4C. That is, the fourth area A4 is an area disposed outside the holder 120 at the side of the first opening OP1. The fifth area A5 is an area protruding from the second opening OP2 in the holder 120, and corresponds to the fifth portion 140-5 shown in FIG. 4C. That is, the fifth area A5 is an area disposed outside the holder 120 at the side of the second opening OP2.

In addition, as shown in FIG. 2, the liquid lens unit 140 may include a first connection substrate 141, a liquid lens (or a liquid lens body) 142, a spacer 143, and a second connection substrate 144.

The first connection substrate 141 may be disposed on one of the top or the bottom of the liquid lens 142. For example, as shown in FIGS. 2 and 3, the first connection substrate 141 may be an individual electrode connection substrate, which is disposed on the liquid lens 142. The first connection substrate 141 and the second connection substrate 144 serve to supply voltage to the liquid lens 142. To this end, the first connection substrate 141 may electrically connect a plurality of first electrodes (not shown) included in the liquid lens 142 to the main board 150. The first connection substrate 141 may be implemented as a flexible printed circuit board (FPCB).

FIGS. 5A and 5B respectively illustrate an upper perspective view and a bottom view of the first connection substrate 141.

The first connection substrate 141 may be electrically connected to each of the plurality of first electrodes via first to fourth wirings W1 to W4, and may be electrically connected to a first substrate pad 150-1 formed on the main board 150 via a first connection pad ET, which is electrically connected to the first to fourth wirings W1 to W4. To this end, after the liquid lens unit 140 is inserted into the inner space in the holder 120, the first connection substrate 141 may be subjected to bending in the −z-axis direction toward the main board 150, and thereafter the first connection pad ET and the first substrate pad 150-1 may be electrically connected to each other using conductive epoxy or soldering. In another embodiment, the first connection substrate 141 may be connected to a first holder surface electrode, which is conductive and is disposed, formed, or coated on the surface of the holder 120, so as to be electrically connected to the main board 150 via the first holder surface electrode, which is conductive and is disposed on the surface of the holder 120, but the embodiments are not limited thereto.

The second connection substrate 144 may be disposed on the other one of the top or the bottom of the liquid lens 142. For example, as shown in FIGS. 2 and 3, the second connection substrate 144 may be a common electrode connection substrate disposed under the liquid lens 142. The first connection substrate 141 and the second connection substrate 144 serve to supply voltage to the liquid lens 142. To this end, the second connection substrate 144 may electrically connect a second electrode (not shown) included in the liquid lens 142 to the main board 150. Here, the first and second electrodes will be described later in detail with reference to FIG. 7. The second connection substrate 144 may be implemented as an FPCB or a single metal substrate (a conductive metal plate).

FIGS. 6A, 6B and 6C respectively illustrate an upper front perspective view, an upper rear perspective view, and a plan view of the second connection substrate 144.

The second connection substrate 144 may be electrically connected to the second electrode via fifth and sixth wirings W5, W5-1, W6 and W6-1, and may be electrically connected to a second substrate pad 150-2 formed on the main board 150 via a second connection pad CT (e.g. CT1), which is commonly connected to the fifth and sixth wirings W5, W5-1, W6 and W6-1. To this end, after the liquid lens unit 140 is inserted into the inner space in the holder 120, the second connection substrate 144 may be subjected to bending in the −z-axis direction toward the main board 150, and thereafter the second connection pad CT and the second substrate pad 150-2 may be electrically connected to each other using conductive epoxy or soldering. In another embodiment, the second connection substrate 144 may be connected to a second holder surface electrode, which is conductive and is disposed, formed, or coated on the surface of the holder 120, so as to be electrically connected to the main board 150 via the second holder surface electrode, which is conductive and is disposed on the surface of the holder 120, but the embodiments are not limited thereto.

The liquid lens 142 may include a cavity CA. As shown in FIG. 3, the area of the opening in the direction in which light is introduced into the cavity CA may be smaller than the area of the opening in the opposite direction. Alternatively, the liquid lens 142 may be disposed such that the direction of inclination of the cavity CA is opposite what is illustrated. That is, unlike the illustration of FIG. 3, the area of the opening in the direction in which light is introduced into the cavity CA may be greater than the area of the opening in the opposite direction. In addition, when the liquid lens 142 is disposed such that the direction of inclination of the cavity CA is opposite what is illustrated, the arrangement of all or some of the components included in the liquid lens 142 may be changed, or only the direction of inclination of the cavity CA may be changed and the arrangement of the remaining components may not be changed, according to the direction of inclination of the liquid lens 142. The concrete configuration of the liquid lens 142 will be described later in detail with reference to FIG. 7.

The spacer 143 may have a ring shape, and may be disposed so as to surround the side surface of the liquid lens 142, thereby protecting the liquid lens 142 from external impacts. To this end, the spacer 143 may have a shape that allows the liquid lens 142 to be mounted in, seated in, in contact with, fixed to, provisionally fixed to, supported by, coupled to, or disposed in the spacer.

For example, the spacer 143 may include a hollow region 143H1 in which the liquid lens 142 is accommodated and a frame configured to surround the hollow region 143H1 formed in the center thereof. As such, the spacer 143 may have a shape of a rectangular plane having a hollow center (hereinafter referred to as a '☐'-shaped form), but the embodiments are not limited thereto.

In addition, the spacer 143 may be disposed between the first connection substrate 141 and the second connection substrate 144. The spacer 143 may include uneven portions formed at the upper portion and the lower portion thereof in order to enhance engagement with the first and second connection substrates 141 and 144 using an adhesive material. The spacer 143 may be disposed so as to protrude from at least one of the first or second opening OP1 or OP2 in the holder 120. That is, at least a portion of the spacer 143 may be shaped so as to protrude, together with the first and second connection substrates 141 and 144, from at least one of the first or second sidewall S1 or S2 of the holder 120 in the direction perpendicular to the optical axis LX (e.g. in the x-axis direction). The reason for this is that the length of the spacer 143 in the x-axis direction is greater than the length of the holder 120 in the x-axis direction. Thus, the portions of the spacer 143 that protrude from the first and second sidewalls S1 and S2 may respectively correspond to the fourth and fifth portions 140-4 and 140-5 of the liquid lens unit 140 shown in FIG. 4C (i.e. the fourth area A4 and the fifth area A5 shown in FIG. 3).

In addition, the spacer 143 may be brought into contact with a gripper when the spacer 143 is inserted into the holder 120 and during active alignment.

The spacer 143 may not be disposed in either the first opening OP1 or the second opening OP2. Alternatively, at least a portion of the spacer 143 may be disposed in at least one of the first opening OP1 or the second opening OP2. As illustrated in FIGS. 2, 4A and 4B, it can be appreciated that at least a portion of the spacer 143 is disposed in each of the first and second openings OP1 and OP2 because the spacer 143 has a '☐'-shaped form and surrounds the liquid lens 142.

In addition, at least a portion of the liquid lens 142 may be disposed in at least one of the first opening OP1 or the second opening OP2. Referring to FIG. 3, it can be appreciated that a first plate 147 of the liquid lens 142, which is a component of the liquid lens 142, is disposed in each of the first and second openings OP1 and OP2.

Alternatively, unlike the illustration of FIG. 3, at least a portion of the spacer 143 may be disposed in each of the first and second openings OP1 and OP2, and the liquid lens 142 may not be disposed therein.

Meanwhile, the first adhesive member 162 may be disposed between the holder 120 and the liquid lens unit 140 in the first opening OP1 in the holder 120. As shown in FIG. 3, the first adhesive member 162 may be disposed in the second area A2 of the liquid lens unit 140, and may be disposed on the upper surface, the lower surface, and the side portions of the second portion 140-2 of the liquid lens unit 140.

In addition, the second adhesive member 164 may be disposed between the holder 120 and the liquid lens unit 140 in the second opening OP2 in the holder 120. As shown in FIG. 3, the second adhesive member 164 may be disposed in the third area A3 of the liquid lens unit 140, and may be disposed on the upper surface, the lower surface, and the side portions of the third portion 140-3 of the liquid lens unit 140.

In addition, referring to FIG. 3, the holder 120 may include an upper holder area 120U disposed above the liquid lens unit 140 and a lower holder area 120D disposed below the liquid lens unit 140. In this case, the first and second adhesive members 162 and 164 may couple the upper holder area 120U and the lower holder area 120D to the liquid lens unit 140.

As described above, through the arrangement of the first and second adhesive members 162 and 164, the liquid lens unit 140 is capable of being stably fixed and coupled to the holder 120.

In addition, although each of the first and second adhesive members 162 and 164 is illustrated in FIG. 2 as having a hexahedral shape, the embodiments are not limited thereto. That is, as long as the first and second adhesive members 162 and 164 can be disposed between the liquid lens unit 140 and the holder 120 in the first and second openings OP1 and OP2, the embodiments are not limited to any specific shape of each of the first and second adhesive members 162 and 164. That is, the first and second adhesive members 162 and 164 may have shapes corresponding to the shapes of the first and second openings OP1 and OP2. In addition, each of the first and second adhesive members 162 and 164 may have an integral shape, as shown in FIG. 2, or may be divided into a plurality of segments, unlike what is shown in FIG. 2.

Meanwhile, referring to FIGS. 2 and 3, the middle base 172 may be disposed so as to surround the second hole H2 in the holder 120. To this end, the middle base 172 may include an accommodation hole 172H for accommodating the second hole H2 therein. The inner diameter of the middle base 172 (i.e. the diameter of the accommodation hole 172H) may be equal to or greater than the outer diameter of the second hole H2.

Here, each of the accommodation hole 172H in the middle base 172 and the second hole H2 is illustrated as having a circular shape, but the embodiments are not limited thereto, and these holes may be changed to have any of various other shapes.

The filter 176 may be disposed between the middle base 172 and the image sensor 182, and may filter light within a specific wavelength range, among the light that has passed through the first lens unit 110, the liquid lens 142, and the second lens unit 130. For example, the filter 176 may be an infrared (IR) light blocking filter or an ultraviolet (UV) light blocking filter, but the embodiments are not limited thereto. The filter 176 may block ultraviolet light, particularly UV-A light, which may be transmitted from the lens assembly. UV-C light has a relatively short wavelength and thus low penetration force, and therefore most UV-C light is blocked by the ozone layer. UV-B light is blocked by general glass, but UV-A light passes through general glass, and therefore a separate blocking layer may be particularly required. Alternatively, the filter 176 may also block infrared (IR) light.

Although the filter 176 is illustrated as being a single layer, this is merely given to display the presence of the filter 176. That is, the filter 176 may be formed in a single layer, as illustrated in FIG. 2, or may be formed in multiple layers, unlike the illustration of FIG. 2.

The filter 176 may be disposed inside the sensor base 178. For example, the filter 176 may be disposed or mounted in an inner recess in the sensor base 178 or on a stepped portion thereof.

The sensor base 178 may be disposed below the middle base 172, and may be attached to the main board 150. The sensor base 178 may surround the image sensor 182, and may protect the image sensor 182 from foreign substances or external impacts. In some cases, at least one of the filter 176 or the sensor base 178 may be omitted.

Although not illustrated, the camera module 100 may further include first and second covers (not shown).

The first cover may be disposed so as to surround the holder 120, the liquid lens unit 140, and the middle base 172, and may protect the plurality of lenses (e.g. 120 and 140), which form the optical system, from external impacts. In addition, in order to allow the first lens unit 110, disposed in the holder 120, to be exposed to external light, the first cover may include an upper opening formed in the upper surface thereof. In addition, a window formed of a light-transmissive material may be disposed in the upper opening, whereby it is possible to prevent foreign substances such as dust or moisture from entering the camera module 100. Similar to the upper opening in the first cover, the accommodation hole 172H may be formed near the center of the middle base 172 at a position corresponding to the position of the image sensor 182, which is disposed in the camera module 100.

The second cover may be mounted above the main board 150 to protect circuit elements 151 disposed on the main board 150 from external impacts. To this end, the second cover may include a space for accommodating the circuit elements 151 therein, in consideration of the shape and position of the circuit elements 151 disposed on the main board 150.

Some of the plurality of circuit elements 151 may cause electromagnetic interference (EMI) or noise. In particular, among the plurality of circuit elements 151, a power inductor may cause greater EMI than other elements. In order to block EMI or noise, the second cover may be disposed so as to cover the circuit elements 151 disposed in the element area of the main board 150. When the second cover is disposed so as to cover the circuit elements 151, the circuit elements 151 disposed on the main board 150 may be protected from external impacts.

The main board 150 may include a recess 150H in which the image sensor 182 may be mounted, seated, tightly disposed, fixed, provisionally fixed, supported, coupled, or accommodated, the circuit elements 151, a connection part (or an FPCB) 152, and a connector 153.

The main board 150 may include a holder area in which the holder 120 is disposed and an element area in which the plurality of circuit elements 151 is disposed.

The sensor base 178 may be mounted in the holder area, which is spaced apart from the element area of the main board 150. The holder 120, in which the middle base 172, the second lens unit 130, the liquid lens unit 140, and the first lens unit 110 are disposed, may be disposed above the sensor base 178.

The circuit elements 151 of the main board 150 may constitute a control module, which controls the liquid lens unit 140 and the image sensor 182. The control module will be described later with reference to FIG. 8. The circuit elements 151 may include at least one of a passive element and an active element, and may have any of various areas and heights. The circuit elements 151 may be provided in a plural number, and may have heights greater than the height of the main board 150 so as to protrude outwards. In the main board 150, the element area in which the circuit elements 151 are disposed and the holder area in which the holder 120 is disposed may be disposed so as not to overlap each other in the direction parallel to the optical axis LX. For example, the plurality of circuit elements 151 may include a power inductor, a gyro sensor, and the like, but the embodiments are not limited to any specific type of the circuit elements 151.

The connector 153 may electrically connect the main board 150 to a power supply or to other devices (e.g. an application processor) outside the camera module 100.

The main board 150 may be implemented as a rigid flexible printed circuit board (RFPCB) including the FPCB 152. The FPCB 152 may be subjected to bending depending on the requirement of the space in which the camera module 100 is mounted.

The image sensor 182 may perform a function of converting the light that has passed through the first lens unit 110, the liquid lens unit 140, and the second lens unit 130 of the lens assembly 110, 120, 130, 140, 162 and 164 into image data. More specifically, the image sensor 182 may generate image data by converting light into analog signals via a pixel array including a plurality of pixels and synthesizing digital signals corresponding to the analog signals.

Hereinafter, an embodiment of the liquid lens unit 140 included in the camera module 100 according to the embodiment described above will be described with reference to FIG. 7.

FIG. 7 illustrates a cross-sectional view of the embodiment 140A of the liquid lens unit 140 described above.

The liquid lens unit 140A shown in FIG. 7 may include a first connection substrate 141, a liquid lens 142, a spacer 143, and a second connection substrate 144. For convenience of description, an illustration of the spacer 143 is omitted from FIG. 7. Since the spacer 143 is the same as that described above, a duplicate description thereof is omitted.

The liquid lens 142 may include a plurality of different types of liquids LQ1 and LQ2, first to third plates 147, 145 and 146, first and second electrodes E1 and E2, and an insulation layer 148.

The plurality of liquids LQ1 and LQ2 may include a first liquid LQ1, which is conductive, and a second liquid (or an insulative liquid) LQ2, which is non-conductive. The first liquid LQ1 and the second liquid LQ2 may be immiscible with each other, and an interface BO may be formed at a contact portion between the first and second liquids LQ1 and LQ2. In an example, the second liquid LQ2 may be disposed on the first liquid LQ1, but the embodiments are not limited thereto.

In addition, in the cross-sectional shape of the liquid lens 142, the edges of the first and second liquids LQ2 and LQ1 may be thinner than the center portions thereof.

The inner side surface of the first plate 147 may form a sidewall i of the cavity CA. The first plate 147 may include third and fourth openings, which are formed in the upper and lower portions of the first plate and have a predetermined inclined surface therebetween. That is, the cavity CA may be defined as an area that is surrounded by the inclined surface of the first plate 147, the third opening disposed adjacent to the second plate 145, and the fourth opening disposed adjacent to the third plate 146.

The diameter of the fourth opening, which is the wider opening among the third and fourth openings, may be set in consideration of the field of view (FOV) required for the liquid lens 142 or the role of the liquid lens 142 in the camera module 100. According to the embodiment, the size (or the area or the width or the diameter) O2 of the fourth opening may be greater than the size (or the area or the width or the diameter) O1 of the third opening. Here, the size of each of the third and fourth openings may be the cross-sectional area in the horizontal direction (e.g. the x-axis direction and the y-axis direction). Alternatively, the size of each of the third and fourth openings may mean the diameter when the opening is a circular shape, and may mean the diagonal length when the opening is a square shape.

The interface BO formed by the two liquids LQ1 and LQ2 may be moved along the inclined surface of the cavity CA by a driving voltage.

The cavity CA, in which the inclined surface is formed and in which the first liquid LQ1 and the second liquid LQ2 are charged, accommodated, or disposed, is a portion through which the light that has passed through the first lens unit 110 passes. Thus, the first plate 147 may be formed of a transparent material, or may include impurities so that light does not easily pass therethrough.

The electrodes may be disposed on one surface and the other surface of the first plate 147. A plurality of first electrodes E1 may be spaced apart from the second electrode E2, and may be disposed on one surface (e.g. the upper surface, the side surface, and the lower surface) of the first plate 147. The second electrode E2 may be disposed on at least a portion of the other surface (e.g. the lower surface) of the first plate 147, and may be in direct contact with the first liquid LQ1.

In addition, the first electrodes E1 may be "n" electrodes (hereinafter, referred to as "individual electrodes"), and the second electrode E2 may be a single electrode (hereinafter, referred to as a "common electrode"). Here, "n" may be a positive integer of 2 or greater.

Each of the first and second electrodes E1 and E2 may include at least one electrode sector. For example, the first electrodes E1 may include a plurality of first electrode sectors, which are electrically separated from each other, and the second electrode E2 may include at least one second electrode sector. Here, the electrode sector means a portion of the electrode. For example, the plurality of first electrode sectors may be sequentially disposed in the clockwise direction (or in the counterclockwise direction) about the optical axis.

The first electrodes E1 may be electrically connected to the controller via the first connection substrate 141 and the first substrate pad 150-1. To this end, the first electrodes E1 may be electrically connected to the first connection substrate 141, the first connection substrate 141 may be electrically connected to the first substrate pad 150-1 via a plurality of wirings and a first connection pad ET, and the first substrate pad 150-1 may be electrically connected to the controller. To this end, the first connection substrate 141 may include a plurality of wirings and a first connection pad ET. Here, the controller may be included in the control circuit 24 described above.

For example, referring to FIGS. 5A and 5B, when the number of first electrode sectors included in the first electrodes E1 is four, one side of each of the first to fourth wirings W1 to W4 may be electrically connected to a respective one of the four first electrode sectors, and the other side of each of the first to fourth wirings W1 to W4 may be electrically connected to the first connection pad ET. Specifically, the first connection pad ET may include four first electrode terminals ET1 to ET4, and the other side of each of the first to fourth wirings W1 to W4 may be electrically connected to a respective one of the first electrode terminals ET1 to ET4. That is, one side of the first wiring W1 may be connected to one of the four first electrode sectors, and the other side of the first wiring W1 may be electrically connected to one ET1 of the first electrode terminals ET1 to ET4. Similarly, one side of each of the second to fourth wirings W2 to W4 may be electrically connected to a corresponding electrode sector among the first electrode sectors, and the other side thereof may be electrically connected to a corresponding electrode terminal among the first electrode terminals ET2 to ET4.

The first electrode terminals ET1 to ET4 of the first connection pad ET may be electrically connected to the controller via the first substrate pad 150-1 of the main board 150.

The second electrode E2 may be electrically connected to the controller via the second connection substrate 144 and the second substrate pad 150-2. To this end, the second electrode E2 may be electrically connected to the second connection substrate 144, the second connection substrate 144 may be electrically connected to the second substrate pad 150-2 via a plurality of wirings and a second connection pad CT, and the second substrate pad 150-2 may be electrically connected to the controller. To this end, the second connection substrate 144 may include a plurality of wirings and a second connection pad CT.

For example, referring to FIGS. 6A to 6C, when the number of second electrode sectors included in the second electrode E2 is four, one side of each of the fifth and sixth wirings W5, W5-1, W6 and W6-1 may be electrically connected to a respective one of the four second electrode sectors, and the other side of each of the fifth and sixth wirings W5, W5-1, W6 and W6-1 may be electrically connected to the second connection pad CT. Here, the wiring W5-1 may be a branch wiring of the fifth wiring W5, and the wiring W6-1 may be a branch wiring of the sixth wiring W6. Specifically, the second connection pad CT may include a second electrode terminal CT1, and the other sides of the fifth and sixth wirings W5, W5-1, W6 and W6-1 may be electrically connected to the second electrode terminal CT1. While the first to fourth wirings W1 to W4 included in the first connection substrate 141 are electrically separated from each other, the fifth and sixth wirings W5, W5-1, W6 and W6-1 included in the second connection substrate 144 may be electrically connected to each other.

The second electrode terminal CT1 of the second connection pad CT may be electrically connected to the controller via the second substrate pad 150-2 of the main board 150.

A portion of the second electrode E2 (i.e. the second electrode sector of the second electrode E2) disposed on the other surface of the first plate 147 may be exposed to the first liquid LQ1, which is conductive, and thus may be electrically connected to the first liquid LQ1.

Each of the first and second electrodes E1 and E2 may be formed of a conductive material. In addition, the second plate 145 may be disposed on one of the top or the bottom of the first plate 147. For example, as shown in FIG. 7, the second plate 145 may be disposed above the first plate 147 and the first electrodes E1. Specifically, the second plate 145 may be disposed on the upper surfaces of the first electrodes E1 and the cavity CA.

The third plate 146 may be disposed on the other one of the top or the bottom of the first plate 147. For example, as shown in FIG. 7, the third plate 146 may be disposed below the first plate 147 and the second electrode E2. Specifically, the third plate 146 may be disposed under the lower surfaces of the first and second electrodes E1 and E2 and the cavity CA.

The second plate 145 and the third plate 146 may be disposed so as to face each other, with the first plate 147 interposed therebetween. In addition, at least one of the second plate 145 or the third plate 146 may be omitted.

At least one of the second or third plate 145 or 146 may have a rectangular planar shape. The third plate 146 may be in contact with and bonded to the first plate 147 in a bonding area around the edges thereof, but the embodiments are not limited thereto.

In addition, the third plate 146 may include a center portion SEC and first and second peripheral portions SEP1 and SEP2. As shown in FIGS. 3 and 7, the thickness of the second plate 145 may be uniform, whereas, in the third plate 146, the thicknesses of the first and second peripheral portions SEP1 and SEP2 may be greater than the thickness of the center portion SEC. However, the embodiments are not limited thereto. According to another embodiment, unlike the illustration of FIGS. 3 and 7, in the third plate 146, the first and second peripheral portions SEP1 and SEP2 and the center portion SEC may have the same thickness as each other.

Each of the second and third plates 145 and 146 may be an area through which light passes, and may be formed of a light-transmissive material. For example, each of the second and third plates 145 and 146 may be formed of glass, and for convenience of processing, may be formed of the same material. In addition, the edge of each of the second and third plates 145 and 146 may have a rectangular shape, without necessarily being limited thereto.

The second plate 145 may be configured to allow the light introduced from the first lens unit 110 to enter the cavity CA in the first plate 147.

The third plate 146 may be configured to allow the light that has passed through the cavity CA in the first plate 147 to travel to the second lens unit 130. The third plate 146 may be in direct contact with the first liquid LQ1.

According to the embodiment, the third plate 146 may have a diameter greater than the diameter of the wider opening among the third and fourth openings in the first plate 147.

In addition, the actual effective lens area of the liquid lens 142 may be narrower than the diameter (e.g. O2) of the wider opening among the third and fourth openings in the first plate 147.

The insulation layer 148 may be disposed so as to cover a portion of the lower surface of the second plate 145 in the upper area of the cavity CA. That is, the insulation layer 148 may be disposed between the second liquid LQ2 and the second plate 145.

In addition, the insulation layer 148 may be disposed so as to cover portions of the first electrodes E1, which form the sidewall of the cavity CA. In addition, the insulation layer 148 may be disposed on the lower surface of the first plate 147 so as to cover portions of the first electrodes E1, the first plate 147 and the second electrode E2. Thus, contact between the first electrodes E1 and the first liquid LQ1 and contact between the first electrodes E1 and the second liquid LQ2 may be prevented by the insulation layer 148.

The insulation layer 148 may cover one (e.g. the first electrodes E1) of the first and second electrodes E1 and E2, and may expose a portion of the other electrode (e.g. the second electrode E2) so that electrical energy is applied to the first liquid LQ1, which is conductive.

Meanwhile, at least one of the first or second connection substrate 141 or 144 described above may include a heater H.

The heater H serves to generate heat in response to a heating voltage. In order to allow the generated heat to be transmitted to the liquid lens 142, the heater H may be disposed so as to face the liquid lens 142, may be disposed in the vicinity of the liquid lens 142, or may be disposed so as to be in contact with the liquid lens 142. The heater H may be disposed at a portion corresponding to the upper surface or the lower surface of the liquid lens 142.

The heating voltage for operating the heater H may be generated by the controller. The controller may be included in the control circuit 24 described above. The controller may generate a heating voltage according to the temperature of the liquid lens 142, and may output the generated heating voltage to the heater H.

The heater H may include at least one of a first or second heater H1 or H2, and the heating voltage may include at least one of a first or second heating voltage.

The first heater H1 may be disposed on the first connection substrate 141, and may be disposed in the vicinity of the third opening, which has the smaller size among the third and fourth openings. Here, the first plate 147 may include a third opening, formed at a position corresponding to the second plate 145, and a fourth opening, formed at a position corresponding to the third plate 146 and having a size different from that of the third opening. As described above with reference to FIG. 7, the third opening may be an opening that is in contact with the second plate 145, the fourth opening may be an opening that is in contact with the third plate 146, and the size O1 of the third opening may be smaller than the size O2 of the fourth opening. The first heater H1 may generate heat in response to a first heating voltage generated by the controller, and the heat generated by the first heater H1 may be transferred to the liquid lens 142.

The second heater H2 may be disposed on the second connection substrate 144, and may be disposed in the vicinity of the fourth opening, which has the larger size among the third and fourth openings. The second heater H2 may generate heat in response to a second heating voltage generated by the controller, and the heat generated by the second heater H2 may be transferred to the liquid lens 142.

The heat generated by the first heater H1, which is disposed in the vicinity of the third opening, having a smaller size, may be transferred to the liquid lens 142 in a larger amount than the heat generated by the second heater H2, which is disposed in the vicinity of the fourth opening, having a larger size. Thus, according to an embodiment, the heater H may include only the first heater H1, and according to another embodiment, the heater H may include both the first heater H1 and the second heater H2.

Referring to FIGS. 5A and 5B, the first connection substrate 141 may include a first through-hole 141H, a first support portion 141-1, and a first heating wire HW1.

The first through-hole 141H may have a diameter equal to or larger than the diameter O1 of the third opening. The reason for this is that, when the diameter of the first through-hole 141H is smaller than the diameter O1 of the third opening, the incidence of light may be obstructed. For example, as shown in FIG. 7, the diameter of the first through-hole 141H may be equal to the diameter O1 of the third opening. Unlike the illustration of FIG. 7, the diameter of the first through-hole 141H may be larger than the diameter O1 of the third opening.

The first support portion 141-1 may be disposed around the first through-hole 141H.

The first heating wire HW1 is disposed in the first support portion 141-1, and corresponds to the first heater H1 described above.

According to an embodiment, as shown in FIG. 7, the first heating wire H1:HW1 may be disposed so as to be embedded in the first support portion 141-1. In this case, the first heating wire HW1 is invisible from the outside. In this way, the first heater H1 may be embedded in the first support portion 141-1 in the form of a hot wire.

According to another embodiment, as shown in FIG. 5B, the first heating wire HW1 may be disposed on the bottom surface of the first support portion 141-1, which faces the liquid lens 142, so as to be exposed therefrom, rather than being embedded in the first support portion 141-1.

The first heating wire HW1 generates heat in response to the first heating voltage output from the controller. To this end, the first connection pad ET may further include first heating terminals ET5 and ET6. The first heating terminals ET5 and ET6 may electrically connect the first heating wire HW1 to the controller. Specifically, one side of the first heating wire HW1 may be electrically connected to one ET5 of the first heating terminals ET5 and ET6, and the other side of the first heating wire HW1 may be electrically connected to the other one ET6 of the first heating terminals ET5 and ET6. Thus, through the connection of the first heating terminals ET5 and ET6 to the first substrate pad 150-1, the first heating voltage output from the controller may be transmitted to the first heating wire HW1 via the first substrate pad 150-1 and the first heating terminals ET5 and ET6.

Referring to FIGS. 6A to 6C, the second connection substrate 144 may include a second through-hole 144H, a second support portion 144-1, and a second heating wire HW2.

The second through-hole 144H may have a diameter equal to or larger than the diameter O2 of the fourth opening. The reason for this is that, when the diameter of the second through-hole 144H is smaller than the diameter O2 of the fourth opening, the incidence of light may be obstructed. According to an embodiment, as shown in FIG. 7, the diameter O3 of the second through-hole 144H may be larger than the diameter O2 of the fourth opening.

According to another embodiment, unlike the illustration of FIG. 7, the diameter O3 of the second through-hole 144H may be equal to the diameter O2 of the fourth opening.

Referring to FIG. 7, in the third plate 176, the thickness of the center portion SEC is smaller than the thickness of each of the first and second peripheral portions SEP1 and SEP2. Although the thickness of the third plate 146 is not uniform as shown in FIG. 7, if the second heating wire WH2 is disposed so as to extend to edge areas SEC1 and SEC2 of the center portion SEC, the vertical distance that the second heating wire WH2 is spaced apart from the edge areas SEC1 and SEC2 in the z-axis direction is greater than the vertical distance that the second heating wire WH2 is spaced apart from the first and second peripheral portions SEP1 and SEP2 in the z-axis direction, thus leading to deterioration in the efficiency of transfer of heat from the heating wire WH2 to the liquid lens 142 via the third plate 146. Thus, the second heating wire WH2 may be disposed only below the first and second peripheral portions SEP1 and SEP2. Accordingly, the heat generated by the second heating wire WH2 may be more efficiently transferred to the liquid lens 142 via the third plate 146. However, the embodiments are not limited thereto, and the second heating wire WH2 may be disposed so as to extend to the edge areas SEC1 and SEC2.

Further, in the case in which the thickness of the center portion SEC of the third plate 176 and the thicknesses of the first and second peripheral portions SEP1 and SEP2 are all equal to each other, the diameter O3 of the second through-hole 144H may be equal to the diameter O2 of the fourth opening. That is, the second heating wire WH2 may be disposed so as to extend from the center portion SEC to the edge areas SEC1 and SEC2, except for the fourth opening. In this case, the efficiency of transfer of the heat generated by the second heating wire HW2 to the liquid lens 142 via the third plate 146 may be increased.

The second support portion 144-1 may be disposed around the second through-hole 144H.

The second heating wire HW2 is disposed in the second support portion 144-1, and corresponds to the second heater H2 described above.

According to an embodiment, as shown in FIG. 7, the second heating wire H2:HW2 may be disposed so as to be embedded in the second support portion 144-1. In this case, the second heating wire HW2 is invisible from the outside.

According to another embodiment, as shown in FIGS. 6A to 6C, the second heating wire HW2 may be disposed on the top surface of the second support portion 144-1, which faces the liquid lens 142, so as to be exposed therefrom, rather than being embedded in the second support portion 144-1.

The second heating wire HW2 generates heat in response to the second heating voltage output from the controller. To this end, the second connection pad CT may further include second heating terminals CT2 and CT3. The second heating terminals CT2 and CT3 may electrically connect the second heating wire HW2 to the controller.

One side of the second heating wire HW2 may be electrically connected to one CT2 of the second heating terminals CT2 and CT3, and the other side of the second heating wire HW2 may be electrically connected to the other one CT3 of the second heating terminals CT2 and CT3. Thus, through the connection of the second heating terminals CT2 and CT3 to the second substrate pad 150-2, the second heating voltage output from the controller may be transmitted to the second heating wire HW2 via the second substrate pad 150-2 and the second heating terminals CT2 and CT3.

As described above, in order for the controller to generate the heating voltage, it is necessary to measure the temperature of the liquid lens. To this end, the temperature sensor 190 may sense the temperature of the liquid lens 142, and may output the sensed temperature to the controller. In order to sense the temperature of the liquid lens 142, the temperature sensor 190 may be disposed at any of various positions. The embodiments are not limited to any specific position of the temperature sensor 190.

According to an embodiment, the temperature sensor 190 may be disposed on the spacer 143. In an example, as shown in FIG. 2, the spacer 143 may further include a receiving recess 143H2 to receive the temperature sensor 190 therein. The receiving recess 143H2 may be formed in the inner side of the spacer 143 that faces the liquid lens 142.

According to another embodiment, the temperature sensor 190 may be disposed outside, above, or below the spacer 143.

According to still another embodiment, the temperature sensor 190 may be directly disposed in the liquid lens 142.

The temperature sensed by the temperature sensor 190 may be supplied to the controller via the first or second connection substrate 141 or 144. In an example, as shown in FIGS. 6A to 6C, the temperature sensed by the temperature sensor 190 may be supplied to the controller via the second connection substrate 144. To this end, the second connection substrate 144 may further include seventh and eighth wirings W7 and W8. One side of the temperature sensor 190 may be electrically connected to the seventh wiring W7, and the other side of the temperature sensor 190 may be electrically connected to the eighth wiring W8. In addition, the second connection pad CT may further include temperature terminals CT4 and CT5. The temperature terminals CT4 and CT5 may connect the temperature sensor 190 to the controller. That is, the seventh wiring W7 may be connected to one CT4 of the temperature terminals CT4 and CT5, the eighth wiring W8 may be connected to the other one CT5 of the temperature terminals CT4 and CT5, and the temperature terminals CT4 and CT5 may be connected to the second substrate pad 150-2, whereby the temperature sensed by the temperature sensor 190 may be supplied to the controller.

In addition, at least one of the first or second heating wire HW1 or HW2 may have a heating pattern. In an example, as shown in FIG. 5B, the first heating wire HW1 may be disposed around the first through-hole 141H in a zigzag pattern. In addition, as shown in FIGS. 6A to 6C, the second heating wire HW2 may be disposed around the second through-hole 144H in a zigzag pattern, similar to the first heating wire HW1. When each of the first and second heating wires HW1 and HW2 has the pattern described above, more of the heat generated by each of the first and second heating wires HW1 and HW2 may be rapidly and evenly transferred to the liquid lens 142.

Hereinafter, an embodiment of a method of manufacturing the camera module 100 will be described with reference to the accompanying drawings. The camera module 100 according to the embodiment may also be manufactured through a method different from the manufacturing method to be described below.

First, the image sensor 182 may be mounted on the main board 150, and the holder 120 to which the middle base 172 is coupled may be mounted on, seated on, in contact with, provisionally fixed to, supported by, coupled to, or disposed on the main board 150.

At this time, active alignment (first alignment) between the first and second lens units 110 and 130, which are mounted in the holder 120, and the image sensor 182 may be performed. The first alignment may be performed by adjusting the positions of the middle base 172 and the holder 120 while supporting the two opposite sides of the middle base 172. The first alignment may be performed while moving a jig, which presses and fixes the two opposite sides of the middle base 172. The middle base 172 may be fixed to the main board 150 in the completed state of first alignment.

Subsequently, the liquid lens unit 140 may be inserted into the holder 120 through at least one of the first or second opening OP1 or OP2 in the holder 120, and active alignment between the liquid lens unit 140 and the image sensor 182 may be performed as second alignment. The second alignment may be performed by adjusting the position of the liquid lens unit 140 while supporting the liquid lens unit 140 in the x-axis direction. The second alignment may be performed while moving a jig, which presses and fixes the liquid lens unit 140 in the x-axis direction.

Subsequently, each of the first and second adhesive members 162 and 164 may be formed in the empty space between the holder 120 and the liquid lens unit 140 in a respective one of the first and second openings OP1 and OP2, thereby fixing the liquid lens unit 140 to the holder 120.

Subsequently, each of the first connection substrate 141 and the second connection substrate 144 may be bent so as to be electrically connected to a respective one of the first substrate pad 150-1 and the second substrate pad 150-2 of the main board 150. After the bending process, a soldering process is performed for electrical connection between each of the first connection substrate 141 and the second connection substrate 144 and the main board 150.

Subsequently, the first cover is disposed so as to cover the first lens unit 110, the holder 120, the second lens unit 130, the liquid lens unit 140, and the middle base 172, thereby completing manufacture of the camera module 100.

Meanwhile, the components 110 to 190 illustrated in FIGS. 1 to 7 may be maintained in contact with, coupled, fixed, or bonded to each other using epoxy. To this end, when attempting to bring into contact with, couple, fix, or bond two components among the components 110 to 190, epoxy application, UV curing, and thermal curing may be sequentially performed. In some embodiments, any one curing process may be omitted, or another bonding process may be added, according to the materials or properties of the components.

In addition, when a driving voltage is applied to the first and second electrodes E1 and E2 through the first connection substrate 141 and the second connection substrate 144, the interface BO between the first liquid LQ1 and the second liquid LQ2 may be deformed, and thus at least one of the shape, such as a curvature, or the focal length of the liquid lens 142 may be changed (or adjusted). For example, the focal length of the liquid lens 142 may be adjusted as at least one of the flexure or the inclination of the interface BO formed in the liquid lens 142 is changed according to the driving voltage. When the deformation or the radius of curvature of the interface BO is controlled, the liquid lens 142, the lens assembly 110, 120, 130, 140, 162 and 164 including the liquid lens 142, the camera module 100, and the optical device may perform an auto-focusing (AF) function and a hand-tremor compensation or optical image stabilization (OIS) function.

The first connection substrate 141 may transmit four different driving voltages (hereinafter referred to as "individual voltages") to the liquid lens 142, and the second connection substrate 144 may transmit one driving voltage (hereinafter referred to as a "common voltage") to the liquid lens 142. The common voltage may include a DC voltage or an AC voltage. When the common voltage is applied in a pulse form, the pulse width or the duty cycle may be constant. The individual voltages supplied via the first connection substrate 141 may be applied to the plurality of first electrodes E1 (or the plurality of electrode sectors) exposed at the respective corners of the liquid lens 142. The common voltage supplied via the second connection substrate 144 may be applied to the plurality of second electrodes E2 (or the plurality of electrode sectors) exposed at the respective corners of the liquid lens 142.

The first connection substrate 141 and the plurality of first electrodes E1 may be in contact with each other, may be coupled to each other, and may be in electrical conduction with each other due to conductive epoxy disposed between the first connection substrate 141 and the plurality of first electrodes E1. In addition, the second connection substrate 144 and the second electrode E2 may be in contact with each other, may be coupled to each other, and may be in electrical conduction with each other due to conductive epoxy disposed between the second connection substrate 144 and the second electrode E2.

In addition, the first connection substrate 141 and the plurality of first electrodes E1 may be implemented as separate elements, or may be integrally formed. In addition, the second connection substrate 144 and the second electrode E2 may be implemented as separate elements, or may be integrally formed.

FIG. 8 is a schematic block diagram of the camera module 200.

Referring to FIG. 8, the camera module 200 may include a control circuit 210 and a lens assembly 250. The control circuit 210 may correspond to the control circuit 24 shown in FIG. 1, and the lens assembly 250 may correspond to the lens assembly 22 shown in FIG. 1 or the lens assembly 110, 120, 130, 140, 162 and 164 shown in FIG. 2.

The control circuit 210 may include a controller 220, and may control the operation of the liquid lens unit 140 including a liquid lens 280. Here, the controller 220 may correspond to the above-described controller, which generates a heating voltage and outputs the same to the heater H.

The controller 220 may have a configuration for performing an AF function and an OIS function, and may control the liquid lens 280 included in the lens assembly 250 using a user request or the result of detection (e.g. a motion signal of a gyro sensor 225). Here, the liquid lens 280 may correspond to the above-described liquid lens 142.

The controller 220 may include a gyro sensor 225, a controller 230, and a voltage driver 235. The gyro sensor 225 may be an independent component that is not included in the controller 220, or may be included in the controller 220.

The gyro sensor 225 may sense the angular velocity of movement in two directions, including a yaw-axis direction and a pitch-axis direction, in order to compensate for hand tremor in the vertical and horizontal directions of the optical device. The gyro sensor 225 may generate a motion signal corresponding to the sensed angular velocity, and may provide the motion signal to the controller 230.

In order to implement an OIS function, the controller 230 may remove a high-frequency noise component from the motion signal using a low-pass filter (LPF) so as to extract only a desired frequency band, may calculate the amount of hand tremor using the motion signal from which the noise has been removed, and may calculate the driving voltage corresponding to the shape that the liquid lens 280 of the liquid lens module 260 needs to have in order to compensate for the calculated amount of hand tremor.

The controller 230 may receive information for an AF function (i.e. information on the distance to an object) from an internal component (e.g. an image sensor 182) or an external component (e.g. a distance sensor or an application processor) of the optical device or the camera module 200, and may calculate the driving voltage corresponding to the desired shape of the liquid lens 280 based on a focal length required in order to focus on the object using the distance information. The controller 230 may store a driving voltage table in which a driving voltage and a driving voltage code for making the voltage driver 235 generate the driving voltage are mapped, may acquire the driving voltage code corresponding to the calculated driving voltage by referring to the driving voltage table, and may output the acquired driving voltage code to the voltage driver 235.

In addition, the controller 230 may analyze the temperature of the liquid lens 142 sensed by the temperature sensor 190. Upon determining that the temperature of the liquid lens 142 is low based on the result of the analysis, the controller 230 may calculate a heating voltage to make the heater H generate heat. The controller 230 may store a heating voltage table in which a heating voltage and a heating voltage code for making the voltage driver 235 generate the heating voltage are mapped, may acquire the heating voltage code corresponding to the calculated heating voltage by referring to the heating voltage table, and may output the acquired heating voltage code to the voltage driver 235.

The voltage driver 235 may generate, based on the driving voltage code and the heating voltage code supplied in digital form from the controller 230, a driving voltage and a heating voltage in analog form, which correspond to the driving voltage code and the heating voltage code, and may provide the driving voltage and the heating voltage to the lens assembly 250.

The voltage driver 235 may include a voltage booster, which receives a supply voltage (e.g. a voltage supplied from a separate power supply circuit) and increases the voltage level, a voltage stabilizer for stabilizing the output of the voltage booster, and a switch for selectively supplying the output of the voltage booster to each terminal of the liquid lens 280.

Here, the switch may include a circuit configuration called an H bridge. A high voltage output from the voltage booster is applied as the power supply voltage of the switch. The switch may selectively supply the applied power supply voltage and a ground voltage to the two opposite ends of the liquid lens 280 as a driving voltage. Here, as described above, the liquid lens 280 may include the four first electrodes E1 including four electrode sectors, the first connection substrate 141, the second electrode E2, and the second connection substrate 144 for driving. The two opposite ends of the liquid lens 280 may mean any one of the plurality of first electrodes E1 and the second electrode E2. Alternatively, the two opposite ends of the liquid lens 280 may mean any one of the four electrode sectors of the four first electrodes E1 and one electrode sector of the second electrode E2.

A pulse-type driving voltage having a predetermined width may be applied to each electrode sector of the liquid lens 280, and the driving voltage applied to the liquid lens 280 is the difference between the voltages applied to the first electrodes E1 and the second electrode E2.

In addition, the switch may selectively supply the applied power supply voltage and the ground voltage to the two opposite ends of the heater H as a heating voltage.

In addition, in order to allow the voltage driver 235 to control the driving voltage applied to the liquid lens 280 depending on the driving voltage code in digital form provided from the controller 230, the voltage booster may control an increase in a voltage level, and the switch may control the phase of a pulse voltage applied to the common electrode and the individual electrodes, thereby generating an analog driving voltage that corresponds to the driving voltage code.

In addition, in order to allow the voltage driver 235 to control the heating voltage applied to the heater H depending on the heating voltage code in digital form provided from the controller 230, the voltage booster may control an increase in a voltage level, and the switch may control the phase of a pulse voltage applied to the two opposite ends of the heater H, thereby generating an analog heating voltage that corresponds to the heating voltage code.

That is, the controller 220 may control the driving voltage applied to each of the first electrodes E1 and the second electrode E2 and the heating voltage applied to the two opposite ends of the heater H.

The control circuit 210 may further include a connector (not shown), which performs a communication or interface function of the control circuit 210. For example, the connector may perform communication protocol conversion for communication between the control circuit 210, which uses an inter-integrated circuit (I2C) communication method, and the lens assembly 250, which uses a mobile industry processor interface (MIPI) communication method. In addition, the connector may receive power from an external source (e.g. a battery), and may supply the power required for the operation of the controller 220 and the lens assembly 250. In this case, the connector may correspond to the connector 153 shown in FIG. 2.

The lens assembly 250 may include a liquid lens module 260, and the liquid lens module 260 may include a voltage provider 270 and a liquid lens 280.

The voltage provider 270 may receive a driving voltage and a heating voltage from the voltage driver 235, may provide the driving voltage to the liquid lens 280, and may provide the heating voltage to the heater H. Here, the driving voltage may be an analog voltage applied across any one of the "n" individual electrodes and one common electrode.

The voltage provider 270 may include a voltage adjustment circuit (not shown) or a noise removal circuit (not shown) for compensating for loss due to terminal connection between the control circuit 210 and the lens assembly 250. Alternatively, the voltage provider 270 may divert the driving voltage provided from the voltage driver 235 to the liquid lens 280, or may divert the heating voltage provided from the voltage driver 235 to the heater H.

The voltage provider 270 may be disposed on an FPCB (or a substrate), which constitutes at least a portion of the connection part 152, but the embodiments are not limited thereto. The connection part 152 may include the voltage provider 270.

The liquid lens 280 may perform at least one of an AF function or an OIS function through deformation of the interface BO between the first liquid LQ1 and the second liquid LQ2 in response to a driving voltage. In addition, the heater H may generate heat in response to a heating voltage, and may supply the heat to the liquid lens 142.

FIGS. 9(a) and (b) are views for explaining the liquid lens 142, the interface of which is adjusted in response to a driving voltage. Specifically, FIG. 9(a) illustrates a perspective view of the liquid lens 142 according to the embodiment, and FIG. 9(b) illustrates an equivalent circuit of the liquid lens 142. Here, the liquid lens 142 is the same as the liquid lens 142 of FIG. 2, and thus is designated by the same reference numeral.

First, referring to FIG. 9(a), the liquid lens 142, the interface BO of which is adjusted in shape in response to a driving voltage, may receive the driving voltage via a plurality of electrode sectors E11, E12, E13 and E14 of the plurality of first electrodes E1, which are disposed in four different directions at a regular angular interval from each other, and an electrode sector CO of the second electrode E2. When the driving voltage is applied via any one of the plurality of electrode sectors E11, E12, E13 and E14 of the plurality of first electrodes E1 and the electrode sector CO of the second electrode E2, the shape of the interface BO between the first liquid LQ1 and the second liquid LQ2, which are disposed in the cavity CA, may change. The degree of deformation and the shape of the interface BO between the first liquid LQ1 and the second liquid LQ2 may be controlled by the controller 230 in order to implement at least one of an AF function or an OIS function.

In addition, referring to FIG. 9(b), the liquid lens 142 may be explained as a plurality of capacitors 143, in which one side of the liquid lens 142 receives voltage from the different electrode sectors E11, E12, E13 and E14 of the first electrodes E1 and the other side of the liquid lens 142 is connected to the electrode sector CO of the second electrode E2 to receive voltage therefrom.

Although it is illustrated in FIG. 9(a) that the number of different electrode sectors E11, E12, E13 and E14 included in the plurality of first electrodes E1 is four, the embodiments are not limited thereto.

In the lens assembly according to the embodiment described above, each of the first and second adhesive members 162 and 164 is disposed in the empty space between the holder 120 and the liquid lens unit 140 in a respective one of the first and second openings OP1 and OP2, thereby coupling the holder 120 and the second and third areas A2 and A3 of the liquid lens unit 140 to each other, whereby the liquid lens unit 140 may be securely fixed to the holder 120.

FIG. 10 is a graph showing changes in an OIS reaction speed according to temperature, in which the horizontal axis represents the temperature and the vertical axis represents the OIS reaction speed.

In general, when the temperature in the vicinity of the camera module 100 is low, the temperature of the liquid lens 142 may also be low. The liquid lens 142 may undergo a phase change from a liquid state to a solid state at a low temperature. In particular, the first liquid LQ1, which is electrically conductive, may undergo a phase change from the liquid state to the solid state. Accordingly, as shown in FIG. 10, the OIS reaction speed is reduced with a decrease in the temperature of the liquid lens 142, resulting in degradation in the performance of the camera module 100.

However, in the case of the camera module 100 according to the embodiment, the temperature sensor 190 detects the temperature of the liquid lens 142 and outputs the result of the detection to the controller. At this time, upon determining that the temperature of the liquid lens 142 is low based on the result of the detection, the controller controls the heater H: H1 and H2 to generate heat using a heating voltage, and the heat is transferred to the liquid lens 142, thereby increasing the low temperature of the liquid lens 142. As a result, according to the embodiment, it is possible to maintain a constant temperature of the liquid lens 142 and thus to maintain a constant OIS reaction speed irrespective of the temperature at the location of the camera module 100, thereby preventing degradation in the performance of the camera module 100. For example, as long as the temperature of the liquid lens 142 is −20° C. or higher, it is possible to prevent degradation in the performance of the camera module 100 using the heater H.

In addition, in the case in which the first and second heaters H1 and H2 are respectively embedded in the first and second support portions 141-1 and 144-1 of the first and second connection substrates 141 and 144, a separate manufacturing process for respectively disposing the first and second heaters H1 and H2 on the first and second support portions 141-1 and 144-1 may be omitted, whereby a process of manufacturing the camera module 100 may be simplified and manufacturing costs may be reduced. The reason for this is that the first and second heating wires WH1 and WH2 can be formed simultaneously when the first to eighth wirings W1 to W8 are formed, and can also be embedded in the first and second support portions 141-1 and 144-1 simultaneously when the first to eighth wirings W1 to W8 are embedded in the first and second support portions 141-1 and 144-1 using epoxy or the like.

Although only a limited number of embodiments have been described above, various other embodiments are possible. The technical contents of the above-described embodiments may be combined into various forms as long as they are not incompatible with one another, and thus may be implemented in new embodiments.

Meanwhile, an optical device may be implemented using the camera module 100 including the lens assembly according to the embodiment described above. Here, the optical device may include a device that may process or analyze optical signals. Examples of the optical device may include camera/video devices, telescopic devices, microscopic devices, an interferometer, a photometer, a polarimeter, a spectrometer, a reflectometer, an auto-collimator, and a lens-meter, and the embodiments may be applied to optical devices that may include a lens assembly.

In addition, the optical device may be implemented in a portable device such as, for example, a smartphone, a laptop computer, and a tablet computer. Such an optical device may include the camera module 100, a display (not shown) configured to output an image, a battery (not shown) configured to supply power to the camera module 100, and a body housing in which the camera module 100, the display, and the battery are mounted. The optical device may further include a communication module, which may communicate with other devices, and a memory, which may store data. The communication module and the memory may also be mounted in the body housing.

It will be apparent to those skilled in the art that various changes in form and details may be made without departing from the spirit and essential characteristics of the disclosure set forth herein. Accordingly, the above detailed description is not intended to be construed to limit the disclosure in all aspects and to be considered by way of example. The scope of the disclosure should be determined by reasonable interpretation of the appended claims and all equivalent modifications made without departing from the disclosure should be included in the following claims.

MODE FOR INVENTION

Various embodiments have been described in the best mode for carrying out the disclosure.

INDUSTRIAL APPLICABILITY

A camera module according to embodiments may be used in camera/video devices, telescopic devices, microscopic devices, an interferometer, a photometer, a polarimeter, a spectrometer, a reflectometer, an auto-collimator, a lens-meter, a smartphone, a laptop computer, a tablet computer, etc.

The invention claimed is:

1. A camera module, comprising:
   a liquid lens;
   a first connection substrate disposed on one of a top or a bottom of the liquid lens;
   a second connection substrate disposed on a remaining one of the top or the bottom of the liquid lens;
   a temperature sensor configured to sense a temperature of the liquid lens; and
   a controller configured to output a heating voltage corresponding to the sensed temperature,
   wherein at least one of the first or second connection substrate comprises a heater configured to generate heat in response to the heating voltage,
   wherein the heater includes:
      a first heater disposed at a position corresponding to an upper surface of the liquid lens; and
      a second heater disposed at a position corresponding to a lower surface of the liquid lens,
   wherein the liquid lens comprises:
      a first plate comprising a cavity having therein an inclined surface and accommodating a conductive liquid and a non-conductive liquid;
      a second plate disposed on one of a top or a bottom of the first plate; and
      a third plate disposed on a remaining one of the top or the bottom of the first plate, the third plate including:
         a center portion; and
         first and second peripheral portions disposed at a peripheral of the center portion, each of the first and second peripheral portions being thicker than the center portion, and
   wherein the second heater is disposed below the first and second peripheral portions.

2. The camera module according to claim 1, wherein the liquid lens further comprises:
   a first electrode disposed on one surface of the first plate, the first electrode being electrically connected to the first connection substrate; and
   a second electrode disposed on an opposite surface of the first plate, the second electrode being electrically connected to the second connection substrate, and
   wherein the first plate comprises a first opening formed at a position corresponding to the second plate and a second opening formed at a position corresponding to the third plate, the second opening having a size different from a size of the first opening.

3. The camera module according to claim 2, wherein the first heater is disposed near the opening having a smaller size among the first opening and the second opening.

4. The camera module according to claim 3, wherein the first connection substrate comprises:
a first through-hole having a diameter equal to or larger than a diameter of the first opening;
a first support portion disposed around the first through-hole; and
a first heating wire disposed at the first support portion as the first heater.

5. The camera module according to claim 4, wherein the first heating wire is embedded in the first support portion.

6. The camera module according to claim 5, wherein the first connection substrate further comprises a first connection pad electrically connected to the controller.

7. The camera module according to claim 6, wherein the first connection pad comprises a first electrode terminal connecting the first electrode to the controller.

8. The camera module according to claim 7, wherein the first connection pad comprises a first heating terminal connecting the first heating wire to the controller.

9. The camera module according to claim 4, wherein the first heating wire has a heating pattern.

10. The camera module according to claim 3, wherein the second heater is disposed near an opening having a larger size among the first opening and the second opening.

11. The camera module according to claim 10, wherein the second connection substrate comprises:
a second through-hole having a diameter equal to or larger than a diameter of the second opening;
a second support portion disposed around the second through-hole; and
a second heating wire disposed at the second support portion as the second heater.

12. The camera module according to claim 11, wherein the second heating wire is disposed on a top surface of the second support portion so as to be exposed therefrom, the top surface facing the liquid lens.

13. The camera module according to claim 11, wherein the second heating wire is disposed so as to be embedded in the second support portion.

14. The camera module according to claim 13, wherein the second connection substrate comprises a second substrate pad electrically connected to the controller.

15. The camera module according to claim 14, wherein the second connection pad comprises a second electrode terminal connected to the controller.

16. The camera module according to claim 15, wherein the second connection pad comprises a second heating terminal connecting the second heating wire to the controller.

17. The camera module according to claim 16, wherein the second connection pad comprises a temperature terminal connecting the temperature sensor to the controller.

18. The camera module according to claim 11, wherein the second heating wire has a heating pattern.

19. The camera module according to claim 1, further comprising a spacer disposed so as to surround the liquid lens, the spacer comprising a receiving recess receiving the temperature sensor therein.

20. The camera module according to claim 19, wherein the receiving recess is formed in an inner side of the spacer that faces the liquid lens.

* * * * *